(12) United States Patent
Dowd et al.

(10) Patent No.: US 9,647,991 B2
(45) Date of Patent: May 9, 2017

(54) SECURE CLOUD-BASED CLIPBOARD FOR TOUCH DEVICES

(71) Applicant: Adobe Systems Incorporated, San Jose, CA (US)

(72) Inventors: Geoffrey Dowd, San Francisco, CA (US); Amir Hussain Memon, Fremont, CA (US); Clark Phillip Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 491 days.

(21) Appl. No.: 13/840,746

(22) Filed: Mar. 15, 2013

(65) Prior Publication Data

US 2014/0267339 A1    Sep. 18, 2014

(51) Int. Cl.
*G09G 5/00* (2006.01)
*H04L 29/06* (2006.01)
(Continued)

(52) U.S. Cl.
CPC ...... *H04L 63/0428* (2013.01); *G06F 3/03545* (2013.01); *G06F 3/04883* (2013.01); *G06F 9/543* (2013.01); *H04L 63/061* (2013.01); *H04L 67/06* (2013.01); *H04L 67/2842* (2013.01); *H04M 1/00* (2013.01); *H04L 67/04* (2013.01); *H04W 4/00* (2013.01)

(58) Field of Classification Search
None
See application file for complete search history.

(56) References Cited

U.S. PATENT DOCUMENTS

D294,263 S     2/1988  Rodgers et al.
D327,476 S     6/1992  Valls et al.
(Continued)

FOREIGN PATENT DOCUMENTS

EP    2146414 A1    1/2010
WO    9320536 A1    10/1993

OTHER PUBLICATIONS

Non-Final Office Action dated May 7, 2015 in U.S. Appl. No. 13/856,070, 13 pages.
(Continued)

*Primary Examiner* — Kyle Zhai
(74) *Attorney, Agent, or Firm* — Shook, Hardy & Bacon L.L.P.

(57) ABSTRACT

Methods and systems for securely transferring assets via a cloud-based clipboard are provided. In an embodiment, input is indicating an asset is received from an input device at a computing device, which transmits to asset to cloud-based storage. The method stores a reference to a storage location of the asset in the cloud-based storage in the input device. The method receives, from the input device, a request for the asset at a second computing device, the request indicating the reference. The requested asset is retrieved from the cloud-based storage and rendered on the second computing device. The asset can be encrypted prior to transmission to the cloud-based storage and a decryption key for the asset is stored in the input device. In response to a request, the encrypted asset is retrieved and provided to a second computing device, where the asset is decrypted using the key from the input device.

20 Claims, 13 Drawing Sheets

(51) Int. Cl.
  *H04L 29/08* (2006.01)
  *H04M 1/00* (2006.01)
  *G06F 9/54* (2006.01)
  *G06F 3/0488* (2013.01)
  *G06F 3/0354* (2013.01)
  *H04W 4/00* (2009.01)

(56) References Cited

U.S. PATENT DOCUMENTS

| | | | |
|---|---|---|---|
| D342,652 S | 12/1993 | Wensley et al. | |
| 5,973,677 A | 10/1999 | Gibbons | |
| D419,043 S | 1/2000 | Staton | |
| D419,541 S | 1/2000 | Kawashima | |
| D433,888 S | 11/2000 | Choi | |
| D457,402 S | 5/2002 | Heck et al. | |
| D472,924 S | 4/2003 | Pan | |
| 6,563,494 B1 | 5/2003 | Eichstaedt et al. | |
| 6,648,536 B1 | 11/2003 | Bellue | |
| D522,579 S | 6/2006 | Sim | |
| D523,709 S | 6/2006 | Knox | |
| D537,309 S | 2/2007 | Wang | |
| D547,141 S | 7/2007 | Shan | |
| D557,086 S | 12/2007 | Lipscomb et al. | |
| D585,489 S | 1/2009 | Han | |
| D615,588 S | 5/2010 | Hillemann | |
| D615,589 S | 5/2010 | Hillemann | |
| D628,031 S | 11/2010 | Stokes et al. | |
| D628,032 S | 11/2010 | Stokes et al. | |
| D630,067 S | 1/2011 | Block et al. | |
| D640,106 S | 6/2011 | Molina et al. | |
| D641,755 S | 7/2011 | Rashid et al. | |
| D642,032 S | 7/2011 | Molina et al. | |
| D681,038 S | 4/2013 | Tomohiro | |
| 8,438,640 B1 | 5/2013 | Vaish et al. | |
| 8,841,881 B2 | 9/2014 | Failing | |
| 8,878,823 B1 | 11/2014 | Kremin et al. | |
| 2001/0001430 A1 | 5/2001 | Ely et al. | |
| 2003/0097410 A1 | 5/2003 | Atkins et al. | |
| 2006/0001654 A1 | 1/2006 | Smits | |
| 2006/0101064 A1 | 5/2006 | Strong et al. | |
| 2006/0108976 A1 | 5/2006 | Chen | |
| 2006/0291701 A1* | 12/2006 | Tanaka | G06K 9/00154 |
| | | | 382/115 |
| 2007/0143379 A1 | 6/2007 | i Dalfo et al. | |
| 2007/0174246 A1 | 7/2007 | Sigurdsson et al. | |
| 2008/0046425 A1 | 2/2008 | Perski | |
| 2008/0169132 A1 | 7/2008 | Ding et al. | |
| 2008/0189659 A1 | 8/2008 | Krutzler | |
| 2009/0175491 A1 | 7/2009 | Charpentier | |
| 2009/0204681 A1 | 8/2009 | Sun | |
| 2009/0244015 A1 | 10/2009 | Sengupta et al. | |
| 2009/0251432 A1 | 10/2009 | Wang et al. | |
| 2009/0287841 A1* | 11/2009 | Chapweske | H04L 65/4084 |
| | | | 709/231 |
| 2010/0021022 A1 | 1/2010 | Pittel et al. | |
| 2010/0079404 A1 | 4/2010 | Degner et al. | |
| 2010/0131675 A1* | 5/2010 | Pan | H04L 63/0442 |
| | | | 709/247 |
| 2010/0164434 A1 | 7/2010 | Cacioppo et al. | |
| 2010/0216107 A1* | 8/2010 | Hines | G09B 7/02 |
| | | | 434/307 R |
| 2010/0289812 A1 | 11/2010 | Kobayashi et al. | |
| 2010/0318534 A1* | 12/2010 | Kaufman | G06F 17/30997 |
| | | | 707/759 |
| 2011/0279081 A1 | 11/2011 | Cacioppo et al. | |
| 2011/0316472 A1 | 12/2011 | Han et al. | |
| 2012/0079578 A1* | 3/2012 | Dachiraju et al. | 726/7 |
| 2012/0105362 A1 | 5/2012 | Kremin et al. | |
| 2012/0226983 A1 | 9/2012 | Goldenberg et al. | |
| 2013/0106722 A1 | 5/2013 | Shahparnia et al. | |
| 2013/0141456 A1* | 6/2013 | Sokolov | G06F 3/14 |
| | | | 345/620 |
| 2013/0154956 A1 | 6/2013 | Tudosoiu | |
| 2013/0234999 A1 | 9/2013 | Kuno | |
| 2013/0278550 A1 | 10/2013 | Westhues | |
| 2014/0188978 A1* | 7/2014 | Ng et al. | 709/203 |
| 2014/0253467 A1* | 9/2014 | Hicks et al. | 345/173 |
| 2014/0253469 A1* | 9/2014 | Hicks | G06F 3/03545 |
| | | | 345/173 |

OTHER PUBLICATIONS

Non-Final Office Action dated Mar. 3, 2015 in U.S. Appl. No. 29/467,046, 6 pages.
Notice of Allowance dated May 21, 2015 in U.S. Appl. No. 29/467,046, 5 pages.
Non-Final Office Action dated Sep. 18, 2014 in U.S. Appl. No. 13/835,959, 21 pages.
Final Office Action dated Feb. 12, 2015 in U.S. Appl. No. 13/835,959, 23 pages.
Notice of Allowance dated Sep. 5, 2013 in U.S. Appl. No. 29/453,913, 9 pages.
WSJ Staff; Samsung Unveils Tablet, Readies Phone; The Wall Street Journal; Digits Technology News and Insights; Feb. 25, 2013; 4 pages.
http://www.tenonedesign.com/connect.php; last accessed on Apr. 3, 2013.
Non-Final Office Action dated May 4, 2015 in U.S. Appl. No. 13/855,997, 12 pages.
Internet Article, Review: Samsung Galaxy Note 10.1 tablet is mightier with pen—CNN.com, Harry McCracken, 3 pgs., Aug. 17, 2012 http://cpf.cleanprint.net/cpd/cpf?action=print&type=file Print& key=cnn&url=http%3A%2F.
Non-Final Office Action dated Jun. 20, 2014 in U.S. Appl. No. 13/572,231, 19 pages.
Final Office Action dated Nov. 6, 2014 in U.S. Appl. No. 13/572,231, 21 pages.
Non-Final Office Action dated Mar. 5, 2015 in U.S. Appl. No. 13/572,231, 21 pages.
Notice of Allowance dated Jul. 8, 2015 in U.S. Appl. No. 13/572,231, 8 pages.
First Action Interview Pre-Interview Communication dated Jul. 1, 2015 in U.S. Appl. No. 13/839,441, 7 pages.
Non-Final Office Action dated Jul. 17, 2015 in U.S. Appl. No. 13/841,089, 29 pages.
Notice of Allowance dated Aug. 31, 2015 in U.S. Appl. No. 13/855,997, 5 pages.
Final Office Action dated Nov. 12, 2015 in U.S. Appl. No. 13/840,746, 26 pages.
Final Office Action dated Nov. 27, 2015 in U.S. Appl. No. 13/839,441, 22 pages.
Notice of Allowance dated Mar. 7, 2016 in U.S. Appl. No. 13/856,070, 5 pages.
Final Office Action dated Mar. 17, 2016 in U.S. Appl. No. 13/841,089, 29 pages.
Non-Final Office Action dated Mar. 22, 2016 in U.S. Appl. No. 13/839,441, 31 pages.
Notice of Allowance dated Jun. 14, 2016 in U.S. Appl. No. 13/839,441, 10 pages.
Non-Final Office Action dated Aug. 10, 2016 in U.S. Appl. No. 13/835,959, 25 pages.
Non-Final Office Action dated Sep. 28, 2016 in U.S. Appl. No. 13/841,089, 28 pages.

* cited by examiner

SECURE CLOUD-BASED CLIPBOARD FOR TOUCH DEVICES

CROSS REFERENCE TO RELATED APPLICATIONS

This application is related to concurrently-filed U.S. Pat. No. 9,467,495, issued on Oct. 11, 2016, and entitled "Transferring Assets Via a Server-Based Clipboard" to Memon, et al., which is incorporated by reference herein in its entirety.

TECHNICAL FIELD

This disclosure relates generally to computer-implemented methods and systems for transferring electronic content and more particularly relates to securely transferring assets and other electronic content via a cloud-based clipboard using input devices used with touch screen computing devices.

BACKGROUND

Users working with multiple devices in a collaborative environment may create artwork or other electronic content on various devices, such as a smart phone, a desktop computer, a tablet computer, etc. Working with multiple devices may require quickly switching between the devices to leverage the strengths of each device. For example, a user may use an application such as Adobe® Ideas® being executed on a tablet computer to sketch a drawing. The user may then transfer the sketch to an instance of an additional application on a different computing device, such as an instance of Adobe® Illustrator® being executed on a desktop computer. The user may transfer the sketch back to the tablet computer for further refinement of the sketch.

While the relatively small size of mobile computing devices aids in portability and collaboration with other users, the size may also prove to be a hindrance for some users and applications, particularly for users who need to view and share electronic assets such as graphics, images, and drawings created on other devices and platforms having different display sizes, resolutions, and color palettes. Similarly, the ability to share and transfer electronic assets between mobile touch devices and other computing devices, such as tablet computers, desktop computers, and laptop computers, is sometimes hindered by the relative lack of storage space on mobile touch devices. Additionally, styli and other touch input devices used to interact with applications executing on touch computing devices typically lack sufficient storage space to store electronic assets users wish to transfer to other touch applications and/or touch computing devices.

Despite advances in mobile technology, mobile devices having touch screens (i.e., 'mobile touch devices') typically have greater limitations on display size, memory capacity, data storage capacity, central processing unit (CPU) capacity, and networkability than desktop and laptop computers. Due to these limitations, some mobile device operating platforms with touch screen interfaces, such as the iOS operating system (OS) developed by Apple Inc., the Android platform from Google Inc., the Microsoft Windows® 8 OS, the Microsoft Windows® Phone OS, the Symbian OS, the Blackberry OS from Research In Motion (RIM) and similar operating systems cannot efficiently or securely be used for cross-device or cross-application sharing of electronic assets. These limitations present challenges when data needs to be displayed and shared in response to copy and paste inputs within a touch-sensitive user interface (UI) of a mobile device. Given the versatility of touch computing devices in general, and mobile touch devices in particular, users of these devices may wish to efficiently and securely store electronic assets copied to a clipboard in a source application and/or computing device and also efficiently retrieve, render, and display these assets in a target application and/or device where a paste operation is initiated.

Prior solutions for transferring data between applications executed on different devices may include manually transferring files via a network, such as the Internet, a wide area network (WAN), or a local area network (LAN). Some prior solutions include manually transferring files via an Internet-based cloud service. Such solutions may involve multiple steps, thereby slowing the workflow of a user. Such solutions for transferring data between different devices may also result in confidential or proprietary data being sent via insecure communication channels and/or being stored 'in the clear' (i.e., in unencrypted form) in network data servers, file servers, database servers, cloud storage, or web servers accessible by third parties. Prior data transfer solutions may also present shortcomings in transferring electronic content between multiple applications executing or accessed from the same computing device. For example, transferring assets between different applications such as Adobe® Ideas®, Adobe® Illustrator®, Adobe® Photoshop®, Adobe® Kuler®, and Paper by FiftyThree, Inc. may not be supported by traditional copy and paste operations using a local clipboard of a computing device. For example, a tablet computer may include multiple applications that are strictly sandboxed from one another. A first application may be focused on certain types of drawings or other electronic content and another application may be focused on other types of drawings or other electronic content. A user may wish to quickly switch between the two applications to transfer data.

SUMMARY

In one embodiment a method includes receiving a first input from an input device at a first computing device. Based at least in part on receiving the first input, the method transmits an asset to a server system remote from the first computing device. The method receives, from the server system, a reference to a storage location of the asset in the server system. The input device includes a storage medium separate from the first computing device. The embodiment also involves storing, in the storage medium of the input, information uniquely identifying the asset or the reference to the storage location of the asset in the server system.

In another embodiment, a computer readable storage medium has executable instructions stored thereon, that if executed by a processor of a cloud storage device, cause the processor to perform operations for transferring an asset. The instructions comprise instructions for storing, in a storage location of the cloud storage device, an asset received from a first computing device in response to a first input to the first computing device from an input device. According to this embodiment, the first computing device is remote from the cloud storage device. The computer readable storage medium also has instructions for creating a reference to the storage location of the asset and instructions for transmitting the reference to the first computing device so that the reference can be stored in a memory of the input device. The computer readable storage medium includes instructions for receiving a request for the asset from a second computing device, the request having been sent in response to a second input to the second computing device from the input device. In this embodiment, the request includes the reference to the storage location of the asset. The instructions further comprise instructions to retrieve the asset from the storage location indicated in the reference in response to receiving the request and instructions to provide the asset to the second computing device.

In another embodiment, a system includes a first computing device with a first display. The first computing device has a first application with a first user interface installed on it. The system also includes a second computing device having a second display. A second application with a second user interface is installed on the second computing device and the second application is different from the first application. The system further comprises an input device having a memory and a wireless transceiver configured to communicate with each the first and second computing devices as well as a cloud storage device remote from the first and second computing devices. In this embodiment, the cloud storage device comprises a processor and a computer readable storage medium having instructions stored thereon, that if executed by the processor, cause the processor to perform operations for storing, in a storage location of the cloud storage device, an asset received from the first computing device in response to a first input to the first application from the input device. The operations also include transmitting a reference to the storage location to the first computing device so that the reference can be stored in the memory of the input device. The operations further comprise receiving a request for the asset from the second application, the request having been sent in response to a second input to the second computing device from the input device. According to this embodiment, the request includes the reference and the operations also identify a rendering attribute for the asset, the rendering attribute having a first value that is specific to rendering the asset in the first user interface. The operations then modify the rendering attribute to have a second value that is specific to rendering the asset in the second user interface before providing the asset with the rendering attribute having the second value to the second computing device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
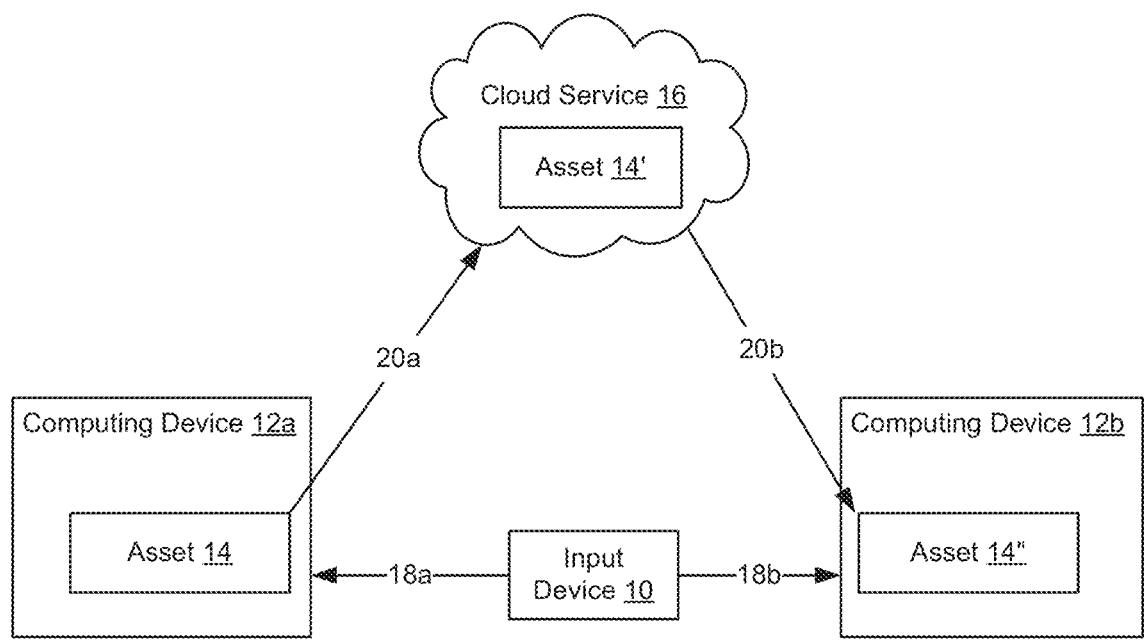
FIG. 1 is a block diagram illustrating communication flows between an input device and computing devices for sharing an asset via a cloud service, in accordance with embodiments.

Methods and systems are disclosed for using an input device to share electronic assets, such as graphical objects, amongst computing devices via a cloud-based service.

Embodiments disclosed herein provide secure, cross-device, cross-application transfer of assets copied to a clipboard on a first touch computing device to a second touch computing device, and vice versa. For example, an asset from a first, source touch computing device may be stored in a cloud storage device, in either unencrypted or encrypted form and then transmitted to the second, destination touch computing device upon receipt of a paste input at the destination touch computing device.

Computer-implemented systems and methods are disclosed for providing a server-based clipboard for securely transferring assets. A server-based clipboard can allow assets such as graphical objects or other electronic content to be moved between applications and/or devices via a single gesture at each application or device rather than via several steps, selections, or gestures at each application or device for transmitting the assets.

The following non-limiting examples are provided to help introduce the general subject matter of certain embodiments. An input device can be a multifunctional stylus and the computing devices are touch computing devices. In accordance with embodiments, the stylus functions as an input device for interacting with one or more touch computing devices and as a storage device for storing information uniquely identifying an asset stored in one or more of a touch computing device and a remote storage location associated with a cloud service. The remote storage location can be a server system remote from the touch computing device. In embodiments, the stylus comprises a storage medium or device for storing information uniquely identifying the asset and a wireless transceiver for transmitting and receiving information between the stylus and the computing devices. In certain embodiments, the stylus can be paired with one or more touch computing devices, such as for example, a tablet computer, a smart phone with a touch screen interface, and/or any other touch computing device. The user may then cause one or more actions to be performed on the touch computing device by interacting with the touch computing device using the stylus. For example, the actions performed on the touch computing device may be selections of one or more assets to be copied to a clipboard, such as a copy input received from an input device. The clipboard can be a local clipboard available to multiple applications installed on the touch computing device where interactions indicating a copy input are received. For example, the local clipboard on the touch computing device can be application-agnostic such that an input device, such as a stylus, that is paired with the touch computing device, can initiate a corresponding paste operation in another application executing on the touch computing device.

Alternatively, depending on the asset's characteristics, the clipboard can be specific to an application executing on the touch computing device when the interaction occurs. In one embodiment, information uniquely identifying the asset copied to the clipboard is stored on a stylus input device after being received at the stylus via a wireless transceiver of the stylus. For example, the stylus may receive the information uniquely identifying the asset via the wireless transceiver, such as a Bluetooth transceiver and/or a wireless network transceiver, and store the information on a computer readable medium or other storage device in the stylus. In certain embodiments, the asset selected for copying is transmitted to a server system. The server system can host a cloud application and offer a cloud storage service. The server system is remote from the touch computing device so that the copied asset can subsequently be retrieved (i.e., pasted) at another touch computing device. In an embodiment, an asset selected for copying is transmitted from a touch computing device to a server system, the asset is stored in the server system, and a reference to a storage location of the asset in the server system is communicated to the touch computing device. According to this embodiment, the reference is then stored on a stylus input device that selected the asset for copying after being received at the stylus from the touch computing device via a wireless transceiver of the stylus.

Additionally, the user may request to retrieve an asset on a touch computing device via the input device. The touch computing device can be the same computing device where the asset was selected for copying. In an embodiment, the request may be in the form of a paste input received from the input device at the touch computing device. For example, in response to such a request, the touch computing device may allow a user to select a target or destination location and application for the requested asset. In this case, a request to paste an asset on the same computing device may result in the asset being pasted from a local clipboard. The target application can be the same application that the asset was copied from or it can be a different application. If the target application differs from an application the asset was copied from, the request to paste the asset can result in the asset being pasted from a local application-agnostic clipboard. In certain embodiments, such cross-application pasting may comprise retrieving the asset from another clipboard and altering a value of one or more rendering attributes before the asset is provided to the target application.

Alternatively, a computing device where a paste input is received can be a different touch computing device than the touch computing device where the asset was copied from. The paste input can be received from the same input device used to perform the copy operation or a different input device. The target application on the different, second touch computing device can be the same application that the asset was copied from or it can be a different application. According to embodiments, a user may use a stylus input device to request to transfer an asset stored in a cloud-based clipboard of a server based system to the second computing device. In this example, the reference to the storage location of the asset in the server system can be transferred from the storage medium of the stylus to the touch computing device via the wireless transceiver of the stylus. In this embodiment, the request for the asset to be copied includes the reference to the storage location of the asset in the server system and the request is sent from the second computing device to the server system.

In certain embodiments, cross-device transfer of assets between different touch computing devices is secured by encrypting assets selected for copying. According to these embodiments, an asset is encrypted prior to transmission or transfer to server-based system for storage. In cases where the asset is encrypted, a decryption key usable to decrypt the encrypted asset is generated. In an embodiment, the encryption and generation of the decryption key occurs on a touch computing device where the asset is selected for copying. The decryption key is stored in the storage medium of the input device and can be received from the touch computing device via the wireless transceiver of the input device. If an encrypted asset is subsequently requested as part of a paste input at a touch computing device, the encrypted asset can be transmitted to the target touch computing device from the server system. The decryption key is transmitted to the destination touch computing device from the input device that initiated the paste operation. The encrypted asset is then decrypted using the decryption key. In an embodiment, the decryption occurs on the destination touch computing device before the asset is provided to a target application for rendering or presentation. According to embodiments, a single decryption key stored in a memory of an input device can be used to decrypt multiple assets copied to a secure cloud-based clipboard.

A server-based clipboard can securely store transient clipboard data received from a first application for a period of time before the clipboard data is provided to a second, target application. On a first, source computing device, a user accessing a first application can perform a gesture to initiate copying of assets or other electronic content in the first application. A non-limiting example of an asset to be copied is an image asset, such as a vector-based graphical object or a raster-based graphical object. A non-limiting example of a gesture to initiate copying is pressing a physical button of a stylus in conjunction with a touch input from a stylus tip at a touch surface of a touch computing device or other input from an input device. The asset to be copied can be encrypted prior to transmission to the server-based clipboard and subsequently decrypted at a destination computing device. As would be understood by those skilled in the relevant art(s), a variety of cryptography techniques and algorithms can be used for generation and exchange of cryptographic keys used to encrypt and decrypt electronic content such as an asset. A non-limiting cryptography technique is asymmetric public-key cryptography using two separate keys, whereby a public encryption key is used to encrypt the asset prior to transmission from a source computing device to the server-based clipboard and a different, private decryption key is used to decrypt the encrypted asset received from the server-based clipboard at a destination computing device. Another exemplary cryptography technique can employ a symmetric-key algorithm that uses the same, private cryptographic key for both encrypting and decrypting the asset. Regardless of the cryptography technique used, a decryption key usable to decrypt an encrypted asset stored in server-based clipboard can be stored in a memory or storage medium of the input device used to initiate the secure copy and paste operations. In certain embodiments, such a decryption key is also encrypted prior to being stored in the input device, so that an encrypted key is stored in input device.

Data representing the asset to be copied can also be serialized for transmission to a server system providing a clipboard. A non-limiting of serializing asset data for transmission includes converting the asset data into an Extensible Markup Language (XML) format, such as a Flash XML Graphics (FXG) format. The first computing device asynchronously transmits the asset to the clipboard provided by the server system. The transmitted asset may be encrypted prior to transmission from the first computing device to the clipboard provided by the server system. In some embodiments, the clipboard can be accessed by computing devices via an instance of a cloud-based service executing on the server system. The cloud-based service can save the asset data to the clipboard by, for example, performing a memory caching operation that stores the data to the clipboard. The cloud service can notify one or more subscribing applications subscribing to the cloud service that the asset is available for retrieval from the server-based clipboard. A second computing device at which a subscribing application is executing can access the clipboard via the cloud service. The subscribing application can retrieve a copy of the asset from the clipboard and store the asset in a memory of a second computing device. In cases where the asset previously copied to the clipboard by the first computing device was encrypted, the retrieved copy is also encrypted. In this example, the encrypted copy of the asset is retrieved from the clipboard and then decrypted before being rendered or displayed by the subscribing application.

A server-based clipboard can enable an image or other asset copied from a first device having a screen with a given size and/or dimensions, such as a smart phone, to be skewed, scaled, or otherwise modified for display on a second, destination device having a screen with a different size and/or dimensions, such as a tablet computer or desktop computer. In embodiments, such processing for the clipboard can be performed on the server system, thereby providing for faster performance than non-server based clipboard applications, such as local clipboard applications on touch computing devices.

As used herein, the term "electronic content" is used to refer to any type of media that can be rendered for display or use at a computing device such as a touch computing device or another electronic device. Electronic content can include text or multimedia files, such as images, video, audio, or any combination thereof. Electronic content can also include application software that is designed to perform one or more specific tasks at a computing device.

As used herein, the term "asset" is used to refer to an item of electronic content included in a multimedia object, such as text, images, videos, or audio files. As used herein, the term "image asset" is used to refer to a digital image, vector graphics, raster graphics, etc. As used herein, the term "video asset" is used to refer to a video file included in a multimedia object. As used herein, the term "text asset" is used to refer to text included in a multimedia object.

As used herein, the term "encrypted asset" is used to refer to an asset having undergone an encryption process so that the asset is encoded in such a way that unauthorized third parties, such as eavesdroppers and hackers, cannot read it. An encrypted asset can be a copy of an asset that has been encrypted using an encryption module or application executing an encryption algorithm, thus converting the asset's data into unreadable cipher text. Encrypted assets may be encrypted using an encryption key that specifies how the asset is to be encoded. Encryption keys can be public or private keys usable to encrypt an asset. Encryption keys may be generated by invoking key-generation algorithms to randomly produce keys.

As used herein, the term "decrypted asset" is used to refer to a previously-encrypted asset having undergone decryption process to decode the encrypted asset. A decrypted asset can be a copy of the asset produced as a result of the encrypted asset's ciphertext having been decoded using a decryption module or algorithm executing a decryption algorithm. Such decryption modules and applications use a decryption key, which can be a private key that third parties do not have access to. Decryption keys may be generated by invoking key-generation algorithms to randomly produce keys.

As used herein, the term "clipboard" is used to refer to a location in a memory device accessible via multiple applications that provides short-term data storage and/or data transfer among documents or applications. Data transfer between documents and applications can be performed via interface commands for transferring data such as cutting, copying, and/or pasting operations. For example, a clipboard can provide a temporary data buffer that can be accessed from most or all programs within a runtime environment. In some embodiments, a clipboard can allow a single set of data to be copied and pasted between documents or applications. Each cut or copy operation performed on a given set of data may overwrite a previous set of data stored on the clipboard. In other embodiments, a clipboard can allow multiple sets of data to be copied to the clipboard without overwriting one another.

As used herein, the term "cloud service" is used to refer to one or more computing resources, including server-based storage, web content, and/or applications, that can be provided as an online service via a data network. The one or more computing resources can be hosted by a plurality of servers and/or a collection of other hardware and can be represented as a single service. The cloud service can provide a digital hub for browsing, creating, sharing, and otherwise using electronic content using one or more applications provided via the cloud service. The server-based storage can comprise one or more cloud storage devices.

In accordance with one embodiment, a cloud application executing on a server system can perform one or more operations on a copied asset before providing the asset to a subscribing application. For example, the cloud application can receive an asset in response to a first application and/or device receiving a first input selecting the asset for copying and subsequently receive a request for the asset in response to a second application and/or device receiving a second input identifying a destination or target for pasting the asset. The cloud application can identify a rendering attribute for the asset. Non-limiting examples of rendering attributes can include one or more color attributes of the asset, a color scheme or color palette for the asset, an aspect ratio for the asset, attributes based on an operating system of a computing device platform providing and/or receiving the asset, attributes based on a display screen size, attributes based on a display screen resolution, and the like. In embodiments, each rendering attribute has a first value that is specific to rendering the asset via the first application, such as a scaling factor used by the first application or a screen size of a first device executing the first application. The cloud application can modify the rendering attribute to have a second value that is specific to rendering the asset via the second application. For example, the cloud application can scale the asset to include a scaling factor used by the second application or to fit a screen size of a second device executing the second application. The cloud application can provide the asset to the second application. The provided asset has the rendering attribute with the second value specific to the second application.

In some embodiments, the cloud application can identify a rendering attribute of the asset based on metadata provided by an application copying the asset to the server-based clipboard. As used herein, the term "metadata" is used to refer to information associated with (and generally but not necessarily stored with) an asset or other electronic content item that provides information about a feature of the electronic content item. Metadata may include information uniquely identifying an asset. Such metadata may describe a storage location or other unique identification of the asset. For example, metadata describing a storage location may include a reference to a storage location of an asset in a server system. One example of such a reference is a Uniform Resource Locator (URL) identifying the storage location on a web server associated with the server-based clipboard. Non-limiting examples of metadata for an asset can include a title, author, keywords, and the like. Metadata may also describe a relationship between a first asset and a second asset, such as how the first and second assets can be combined and sequenced for a multimedia presentation. Metadata can also describe when and how an asset was created, such as information identifying application used to create the asset, a timestamp, a file type, encryption status, and other technical information for the asset, and/or access rights for the asset. In certain embodiments where the asset is encrypted before being transmitted or copied to the server-based clipboard, the metadata can include rendering attributes and their values for the asset. For example, if a rendering attribute is included in metadata for an asset, the metadata can also include a value for that rendering attribute specific to rendering the asset via a source application that the asset was copied from. Depending on the encryption status and/or access rights, an asset may be transmitted to/from the server-based clipboard via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet. SSL and TLS protocols encrypt segments of data network connections using asymmetric cryptography for key exchange, symmetric encryption for confidentiality, and message authentication codes for message integrity. In some embodiments, metadata includes data included in the asset that is not displayed by an application using the asset.

In another embodiment, an application executed on a computing device to perform a copying operation can identify one or more other input devices or other computing devices that may receive a copied asset from the server-based clipboard. The computing device can identify an asset that is rendered by a first application executed at the computing device, such as a tablet computer. The computing device can select the asset for transmission to the server system in response to an input from a first input device, such as touch input from a first stylus. The computing device can copy the asset to a server-based clipboard provided by the server system. The computing device can obtain a network identifier, a reference to the storage location of the asset in the server-based clipboard, or other unique identifier for the asset stored to the server-based clipboard. For example, the application providing the asset to the server system can obtain a reference such as a uniform resource locator (URL) or other reference to the storage location of the asset in the server-based clipboard. A computing device, such as a touch computing device, can identify at least one second input device, such as a second stylus, that is discoverable by the first input device on the data network and/or another wireless network accessible by the computing device. The computing device can provide a copy of the identifier or reference to the second input device. The second input device can provide a touch input or other input and the identifier to a second computing device. The asset can be retrieved by the second computing device, such as another tablet computer or a laptop computer, via a second connection to the server system using the identifier or reference.

Any suitable process can be used for retrieving the asset via the identifier or reference provided by an application performing a copying operation. In one non-limiting example, a cloud service may verify that a second computing device is authorized to retrieve the asset from the server-based clipboard based on the second computing device having the identifier. The second computing device may request the asset from a cloud service in response to a touch input or other input from the second input device. The request for the asset provided to the server system may include the identifier stored to the second input device. The cloud service may verify that the second computing device is authorized to retrieve the asset from the server-based clipboard based on the second computing device providing the identifier in the request for the asset.

In another embodiment, an application can perform one or more pasting operations using a server-based clipboard. For example, a computing device, such as a touch computing device, can identify an input device, such as a stylus, and establish a connection over a data network to a server system providing the server-based clipboard. In embodiments, the connection to the server system is a secure network connection via secure links of the network and/or established using a secure protocol, such as, but not limited to, SSL or TLS. The computing device can respond to a touch input or other input by identifying at least one position for rendering an asset via an application executed at the computing device. The computing device can obtain the asset from the server system via the connection over the data network. In an embodiment, the computing device obtains the asset from the server system via a secure connection over the data network. The computing device can provide the asset obtained from the server system for display via the application at the at least one position.

According to additional or alternative embodiments, assets transmitted to the server system are encrypted at source computing device prior to transmission. In these embodiments, the asset obtained from the server system is an encrypted asset. In one such embodiment, an input device used to request the asset at a destination computing device as part of a paste operation transmits a decryption key stored in the input device to the destination computing device using the input device's wireless transceiver. The destination computing device then decrypts the encrypted asset obtained from the server system using the decryption key.

In additional or alternative embodiments, a server-based clipboard can be used to transfer assets or other data via copy and paste operations between applications executed on the same computing device. For example, multiple applications on a common computing device may be unable to directly transfer assets or otherwise communicate via the resources of the computing device. A first application executing on the common computing device can establish a first connection with the server system. The first application can access a server-based clipboard via the first connection. The first application can copy an asset to the server-based clipboard. A second application executing on the common computing device can establish a second connection with the server system. The second application can access the server-based clipboard via the second connection. The second application can paste the asset from the server-based clipboard. The server-based clipboard can thus provide copy/paste functionality between applications on a common computing device that cannot directly communicate with one another, such as two or more sandboxed applications.

As used herein, the term "sandboxing" is used to refer to one or more security processes executed by a computing device to prevent communication between two or more applications executed on the computing device. For example, each of multiple applications may be executed in a respective sandbox that is a container or other logical object within an operating system. A sandbox container can constrain the respective application from accessing shared resources, such as a shared file system or other memory locations accessible by multiple applications. In some embodiments, the sandbox container can provide access to a limited subset of the shared resources of the operating system, such as a portion of a shared filed system. A clipboard function provided by the computing device can be a shared resource that is excluded from a sandbox container.

These illustrative examples are given to introduce the reader to the general subject matter discussed here and are not intended to limit the scope of the disclosed concepts. The following sections describe various additional embodiments and examples with reference to the accompanying. In the drawings, generally, common or like reference numbers indicate identical or functionally similar elements. Additionally, generally, the left-most digit(s) of a reference number identifies either the drawing in which the reference number first appears or the drawing in which a related element first appears. The following sections describe various additional embodiments and examples with reference to the drawings in which like numerals indicate like elements. For brevity, only the differences occurring within the Figures, as compared to previous or subsequent ones of the figures, are described below.

Exemplary High Level Communications Flow

FIG. 1 is diagram illustrating an example high level communications flow between an input device 10 and computing devices 12a, 12b for sharing an asset 14 via a cloud service 16. The computing devices 12a, 12b can include any type of computing devices, such as tablet computers, smart phones, laptop computer, desktop computers, etc. In exemplary embodiments, computing devices 12a, 12b have at least one user interface comprising a touch surface, such as a touch screen. A computing device 12a, can be, but is not limited to, a personal computer (PC), a Personal Digital Assistant (PDA), a tablet computing device, an iPhone™, an iPod™, an iPad™, a device operating the Android operating system (OS) from Google Inc., a device running the Microsoft Windows® 8 OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile computing device having a capability to communicate with an input device 10, the cloud service 16, and/or via the data network 106 shown in FIG. 2. In some embodiments, the computing devices 12a, 12b can each be the same type of computing device. In other embodiments, the computing devices 12a, 12b can be different types of computing devices.

Figure 2:
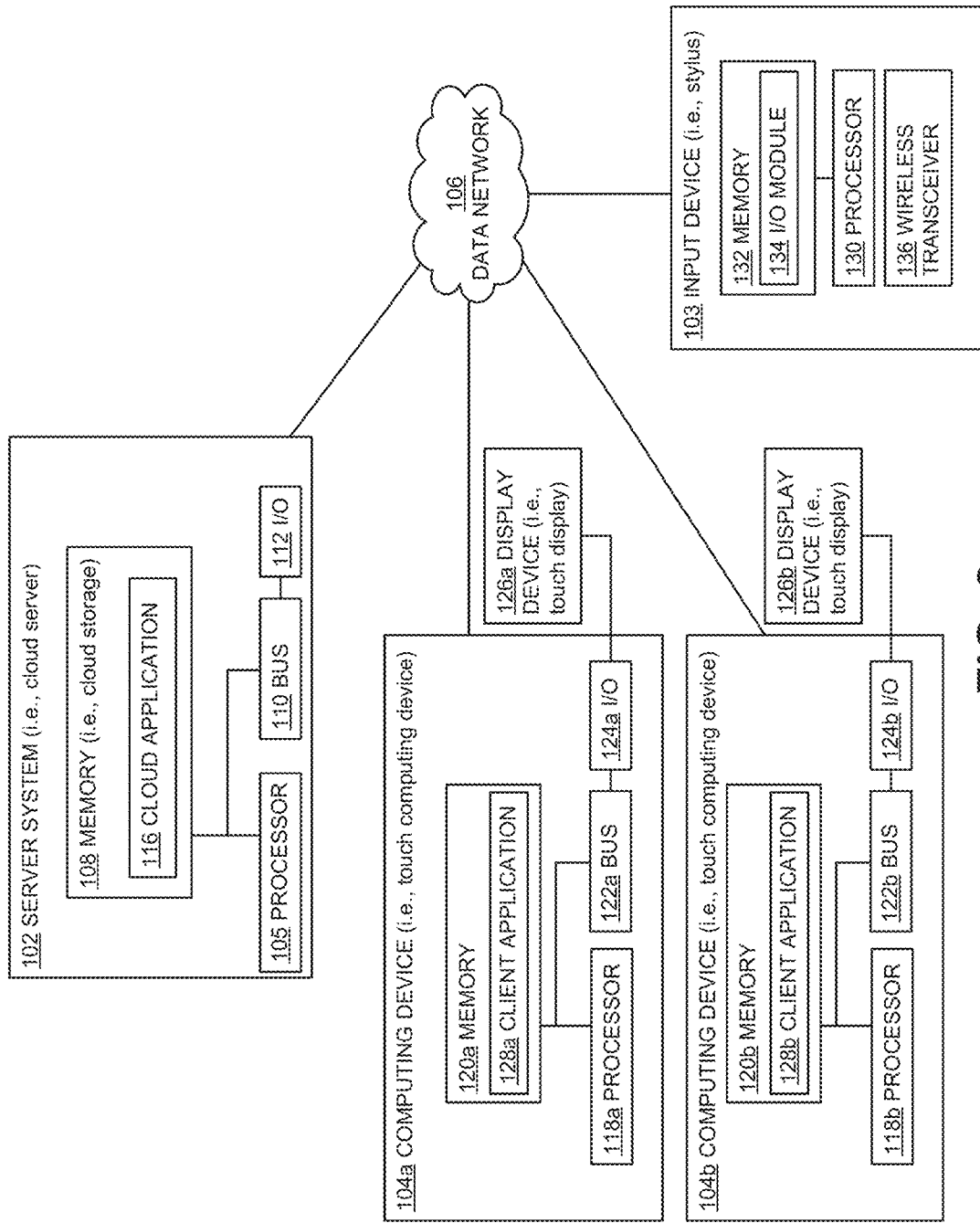
FIG. 2 is a block diagram depicting exemplary computing devices and systems for implementing certain embodiments.

The computing devices 12a, 12b can each be in communication with the cloud service 16 via a data network, such as the Internet or the data network 106 shown in FIG. 2. In some embodiments, the computing devices 12a, 12b can access a common collaborative environment provided by the cloud service. In other embodiments, the computing devices 12a, 12b can each access the cloud service independently from one another.

The computing device 12a can render an asset 14 for display. An asset can include an item of electronic content, such as (but not limited to) an image or vector graphic. The computing device 12a can render the asset 14 via any suitable application, such as, but not limited to, Adobe® Ideas® or Adobe® Illustrator®.

Each of the computing devices 12a, 12b can be configured to receive inputs from the input device 10 for selecting, modifying, or otherwise using assets. The input device 10 can include any suitable device configured for providing input data and/or control signals to the computing devices 12a, 12b. A non-limiting example of an input device 10 is a stylus configured to provide touch inputs to a touch screen device.

The cloud service 16 can provide a server-based clipboard for moving assets between the computing devices 12a, 12b. For example, the computing device 12a can receive a touch input 18a from the input device 10 that initiates copying of the asset 14 to the cloud service 16. The touch input 18a can direct the computing device 12a to transmit a copy of the asset 14 to the cloud service 16. The computing device 12a can transmit the copy of the asset 14 to the cloud service 16 via the communication 20a. The cloud service 16 can store the copy as asset 14'. The computing device 12b can receive a touch input 18b from the input device 10 that initiates pasting of the asset 14' from the cloud service 16 to an application executing at the computing device 12b. The touch input 18b can direct the computing device 12b to request a copy of the asset 14' from the cloud service 16. The cloud service 16 can transmit a copy of the asset 14' to the computing device 12b via the communication 20b. The computing device 12b can store the copy as asset 14". In an embodiment, the asset 14 can be encrypted by the computing device 12a prior to transmission to the cloud service 16.

According to this embodiment, the copy of the asset 14' stored by the cloud service 16 is an encrypted version or copy of the asset 14. In the example embodiment where the asset 14' is store in encrypted form by the cloud service 16, the computing device 12b will decrypt the encrypted copy of the asset' in order to produce and store a decrypted asset 14".

Exemplary System Implementation

FIG. 2 is a block diagram depicting example computing devices and systems for implementing certain embodiments. FIG. 2 is described with continued reference to the embodiment illustrated in FIG. 1. However, FIG. 2 is not limited to that embodiment. The example computing systems include a server system 102. The exemplary computing devices include computing devices 104a, 104b in communication via a data network 106.

The server system 102 includes a processor 105. The processor 105 may include a microprocessor, an application-specific integrated circuit (ASIC), a state machine, or other suitable processing device. The processor 105 can include any number of computer processing devices, including one. The processor 105 can be communicatively coupled to a computer-readable medium, such as a memory 108. The processor 105 can execute computer-executable program instructions and/or accesses information stored in the memory 108. The memory 108 can store instructions that, when executed by the processor 105, cause the processor to perform operations described herein.

A computer-readable medium may include (but is not limited to) an electronic, optical, magnetic, or other storage device capable of providing a processor (see, e.g., the processor 1604 of FIG. 16) with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The server system 102 may also include a number of external or internal devices, such as input or output devices. For example, the server system 102 is shown with an input/output (I/O) interface 112. A bus 110 can also be included in the server system 102. The bus 110 can communicatively couple one or more components of the server system 102. In the non-limiting example of FIG. 2, the server system 102 can be embodied as a cloud server hosting a cloud application 116.

Each of the computing devices 104a, 104b includes respective processors 118a, 118b. Each of the processors 118a, 118b may include a microprocessor, an ASIC, a state machine, or other processor. In the non-limiting example of FIG. 2, the computing devices 104a, 104b can be embodied as touch computing devices such as the exemplary touch computing devices described above with reference to computing devices 12a, 12b shown in FIG. 1. Each of the processors 118a, 118b can include any of a number of computer processing devices, including one. Such a processor can include or may be in communication with a computer-readable medium. As depicted in FIG. 2, each of the processors 118a, 118b is communicatively coupled to respective memories 120a, 120b. Each of the processors 118a, 118b respectively executes computer-executable program instructions and/or accesses information stored in the memories 120a, 120b. The memories 120a, 120b store instructions that, when executed by the processor, cause the processor to perform one or more operations described herein.

The computing devices 104a, 104b may also comprise a number of external or internal devices such as a mouse, a CD-ROM, DVD, a keyboard, a display, audio speakers, one or more microphones, or any other input or output devices. For example, each of the computing devices 104a, 104b is respectively shown with I/O interfaces 124a, 124b and display devices 126a, 126b. A non-limiting example of a display device is a computer monitor or computer screen, such as a touch screen. In the non-limiting example of FIG. 2, the display devices 126a, 126b can be embodied as touch display devices. Although FIG. 2 depicts the display devices 126a, 126b as separate devices coupled to the computing devices 104a, 104b, the display devices 126a, 126b can be respectively integrated into the computing devices 104a, 104b.

Buses 122a, 122b can be respectively included in the computing devices 104a, 104b. Each of the buses 122a, 122b can communicatively couple one or more components of the computing devices 104a, 104b.

FIG. 2 also illustrates the cloud application 116 comprised in the memory 108 of the server system 102 and the client applications 128a, 128b respectively comprised in the memories 120a, 120b of the computing devices 104a, 104b. The cloud application 116 stored in the memory 108 can configure the processor 105 to manage and provide a cloud service accessible by the client applications 128a, 128b. In the non-limiting example of FIG. 2, the memory 108 can function as cloud storage. In alternative embodiments, cloud storage can be implemented as a separate cloud storage device. The cloud storage device can be implemented as one or more file servers, one or more database servers, and/or one or more web servers that form part of the server system 102. The cloud application 116 can include one or more modules for storing, modifying, providing, or otherwise using assets in a cloud service accessed by the client applications 128a, 128b. The cloud storage device can be implemented as a virtual, network-accessible storage device used by the cloud application 116 to store, modify, and provide assets in a server-based clipboard service accessed by the client applications 128a, 128b. The cloud application 116 can store and provide encrypted assets in order to provide a secure server-based (i.e., cloud-based) clipboard. A non-limiting example of a cloud application 116 is Adobe® Creative Cloud server software.

Each of the client applications 128a, 128b can include one or more software modules for establishing communication with a cloud application 116. Each of the client applications 128a, 128b can also include one or more software modules for performing functions in addition to establishing communication with the cloud application 116. For example, each of the client application 128a, 128b can be an image manipulation application having a software module for communicating with the cloud application 116. In some embodiments, each of the client application 128a, 128b can be a different type of application including different functionality. For example, a client application 128a can be Adobe® Ideas® and a client application 128b can be Adobe® Illustrator®. In some embodiments, the client applications 128a, 128b can be stand-alone applications. In other embodiments, the client applications 128a, 128b can be embedded in another application, such as an image manipulation application.

The server system 102 can include any suitable server or computing device for hosting the cloud application 116. In one embodiment, the server system 102 may be a single server, such as a web or application server. In another embodiment, the server system 102 may be presented as virtual server implemented using a number of server systems connected in a grid or cloud computing topology.

The computing devices 104a, 104b can include any suitable computing device or system for communicating via a data network 106 and executing the client applications 128a, 128b. Non-limiting examples of a suitable computing device or system include a desktop computer, a tablet computer, a smart phone, or any other computing device or system suitable for using electronic content.

An input device 103 can include a processor 130 and a storage medium or memory 132. In the non-limiting example of FIG. 2, the input device can be embodied as a stylus. The processor 130 can execute instructions stored in the memory 132. The memory 132 can include an I/O module 134. The I/O module 134 can establish communications with one or more of the computing devices 104a, 104b. The input device 103 can communicate with the computing devices 104a, 104b over the data network 106 or another wireless network, such as a Bluetooth network, via a wireless transceiver 136 or other suitable communication device. In one embodiment, the wireless transceiver is a wireless network transceiver configured to communicate using a Bluetooth protocol (i.e., a Bluetooth transceiver). A non-limiting example of an input device 103 is a stylus or other device configured to provide a touch input or other input to computing devices 104a, 104b. In certain embodiments, the input device 103 is a multifunctional stylus having the storage medium or memory 132 and a wireless transceiver 136 in its body. In other embodiments, the multifunctional stylus also includes a physical button (see, e.g., button 1313 in FIG. 13) and a light emitting diode (LED) such as the LED 1319 shown in FIG. 13. Non-limiting examples of such styli are described in more detail in U.S. patent application Ser. No. 13/572,231 entitled "Multifunctional Stylus", filed Aug. 10, 2012, which is incorporated by reference herein in its entirety.

In some embodiments, the memory 132 and I/O module 134 can be implemented as firmware. As used herein, the term "firmware" is used to refer to one or more operating instructions for controlling one or more hardware components of a device. Firmware can include software embedded on a hardware device. A firmware module or program can communicate directly with a hardware component, such as the processor 130 of the input device 103, without interacting with the hardware component via an operating system of the hardware device.

Exemplary Data Flows for Transferring Assets Via a Cloud-Based Clipboard

Figure 3:
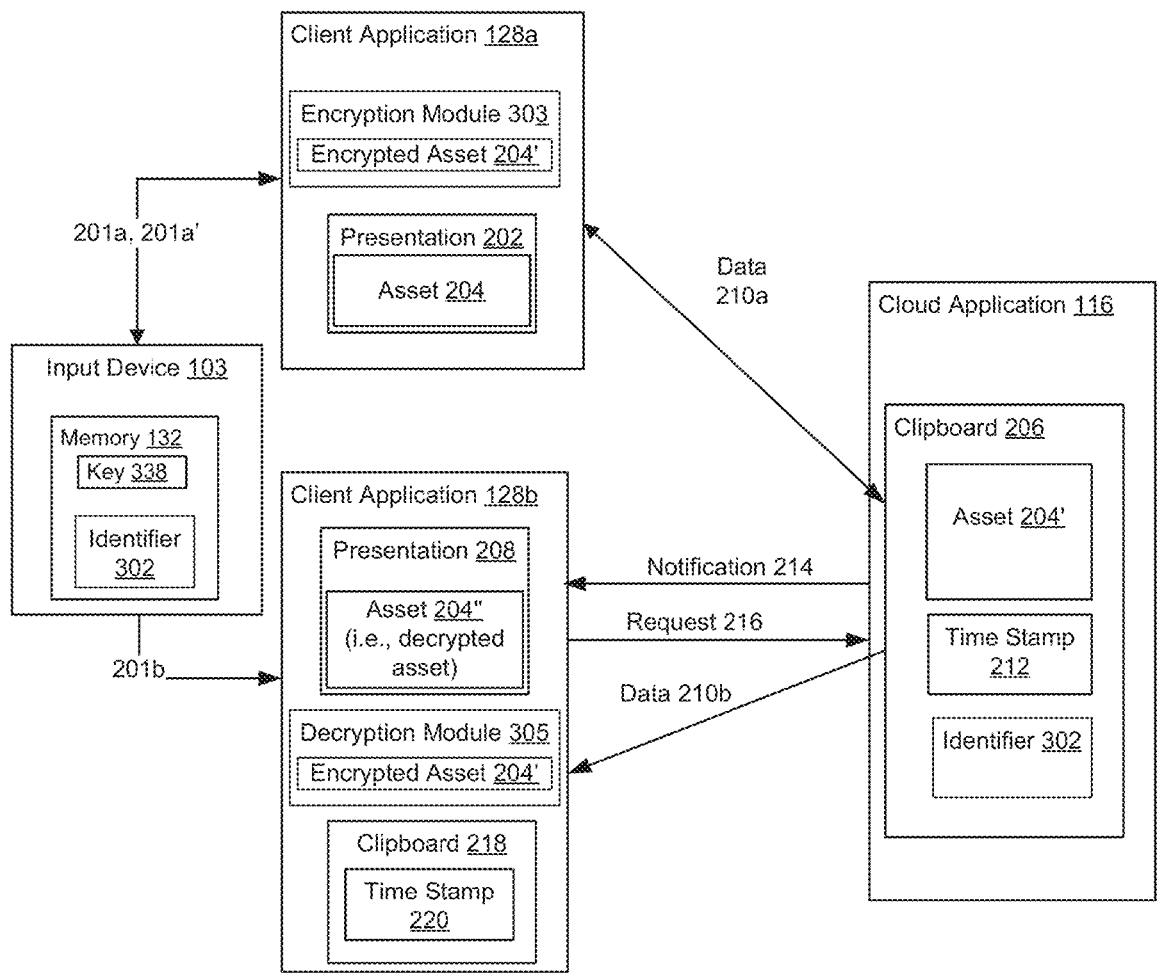
FIG. 3 is a block diagram depicting data flows among the cloud application providing a server-based clipboard and client applications accessing the server-based clipboard, in accordance with embodiments.

FIG. 3 depicts exemplary data flows and communications for transmitting an asset via a cloud application having a server-based clipboard (i.e., a cloud-based clipboard). FIG. 3 is described with continued reference to the embodiments illustrated in FIGS. 1 and 2. However, FIG. 3 is not limited to those embodiments. In particular, FIG. 3 is a diagram depicting a flow of communications among the cloud application 116 providing a server-based clipboard 206 and client applications 128a, 128b accessing the server-based clipboard 206.

In some embodiments, the client applications 128a, 128b can be executed on different computing devices 104a, 104b, as depicted in FIG. 2. As used herein, the terms "cross-device asset transfer" and "cross-device copy/paste" refers to operations for transferring assets or copying and pasting assets between different computing devices (e.g., computing devices 104a and 104b) regardless of whether the assets are being transferred to or pasted into the same client application (e.g., client application 128a) they were copied from. In other embodiments, the client applications 128a, 128b can be executed on a common computing device (e.g., a single computing device 104a such as a tablet computer). The terms "cross-application asset transfer" and "cross-application copy/paste" are used interchangeably herein to refer to operations for transferring assets or copying and pasting assets between different client applications (e.g., client applications 128a and 128b) regardless of whether the applications are executing on the same computing device (e.g., computing device 104a). Client applications 128a, 128b that execute on a common computing device may be unable to directly communicate via the resources of the computing device. For example, one or both of the client applications 128a, 128b may be sandboxed from one another such that at least one of the client applications 128a, 128b cannot access a clipboard stored in a memory device local to the common computing device.

The client application 128a can receive input data 201a from the input device 103 identifying that an asset 204 provided in a presentation 202 via the client application 128a is to be copied. The input data 201a can be generated in response to a touch input by the input device 103 to a computing device at which the client application 128a is executing, such as the computing device 104a. Non-limiting examples of the asset 204 include a vector-based graphical object, a raster-based graphical object, or other graphical data or output provided by the client application 128a.

As shown in the example embodiment of FIG. 3, the client application 128a can also include an encryption module 303 used to encrypt the asset 204 in cases where a secure cross-device or cross-application asset transfer is desired. In such cases, the encryption module 303 encrypts the asset 204 to produce an encrypted copy of the asset, which is copied to the clipboard 206 as copied asset 204' as discussed below. Although the encryption module 303 is depicted as part of the client application 128a in FIG. 3, it is to be understood that in alternative embodiments, the encryption module 303 can be external to the client application 128a. For example, the encryption module 303 can be a separate application or part of an application library elsewhere on a computing device 104a that the client application 128a is executing on (see, e.g., the encryption module 303 in FIG. 5). If the asset 204 is encrypted before being copied to the clipboard 206 as copied asset 204', a decryption key usable to subsequently decrypt the encrypted asset 204' is transmitted to the input device 103 as output data 201a' so that the decryption key 338 can be stored in the memory 132 of the input device 103. In one embodiment, the decryption key 338 is generated by the encryption module or another module (not shown) and transmitted to the input device 103. In alternative embodiments, the decryption key 338 is obtained from a key store, either on a computing device executing the client application 128a, or on another, external computing device. The input data 201a and the output data 201a' can be exchanged wirelessly between a computing device 104a hosting the client application 128a and the input device 103 via the wireless transceiver 136 described above with reference to FIG. 2.

The client application 128a can also serialize the selected asset 204 or the encrypted copy 204' for communication to the cloud application 116. Serializing the selected asset 204 (or encrypted copy 204') can include formatting the asset for transmission via a network connection. One non-limiting of serializing asset data for transmission includes converting the asset data into an FXG format. Non-limiting examples of such serialization and transmission procedures are described in commonly assigned U.S. Pat. No. 9,467,495, issued on Oct. 11, 2016, and entitled "Transferring Assets via a Server-Based Clipboard," by Memon et al.

The client application 128a can coordinate with the cloud application 116 regarding a copy operation in response to the client application 128a receiving the input data 201a. In an embodiment, after a local cut or copy operation is performed in the client application 128a, the cloud application 116 is notified by the client application 128a. In one embodiment, this notification can be sent as part of data 210a sent from the client application 128a to the server-based clipboard 206 provided by the cloud application 116. In embodiments, the server-based clipboard 206 of the cloud application 116 can then receive serialized data 210a representing the asset 204 via a connection between the client application 128a and the cloud application 116 over a data network 106. The cloud application 116 can store the serialized data 210a as a copied asset 204' to the server-based clipboard 206. A non-limiting example of storing the copied asset 204' to the server-based clipboard 206 is performing a memory caching operation. The copied asset 204' may be stored in the clipboard 206 of the cloud application 116 in either encrypted or unencrypted form, depending on whether the encryption module 303 was invoked to create the encrypted asset 204' prior to transmission of the serialized data 210a.

Regardless of whether copied asset 204' stored in the server-based clipboard 206 is encrypted or not, an identifier 302 for the copied asset 204' is created and communicated back to the client application 128a. In the example of FIG. 3, the identifier 302 can be communicated along the same communication link used for the serialized data 210a. Once received by the client application 128a or a computing device 104a executing the client application 128a, the identifier 302 is communicated to the input device 103 as output data 201a'. In an embodiment, the identifier 302 can be wirelessly communicated from a computing device 104a executing the client application 128a to the input device 103 via the wireless transceiver 136 of the input device 103. In embodiments, the identifier 302 is information uniquely identifying the copied asset 204' or a reference to the storage location of the copied asset 204' (either in unencrypted or encrypted form) in the server-based clipboard 206. For example, the identifier 302 can be embodied as a URL identifying a storage location on a web server used as a cloud storage device by the cloud application 116 providing the server-based clipboard 206. As shown in FIG. 3, the identifier 302 received as part of output data 201a' at the input device is then stored in the memory 132 of the input device.

In some embodiments, the cloud application 116 can broadcast or otherwise transmit a notification message 214 to one or more applications subscribing to a cloud service provided by the cloud application, such as the client application 128b. The notification message 214 can notify a destination client application 128b and/or other subscribing applications that the asset 204' is available from the server-based clipboard 206. In other embodiments, no notification message may be provided.

In some embodiments, the notification message 214 can include any message suitable for transmission or broadcast via a protocol for real-time or near real-time communication, such as, but not limited to, an instant messaging protocol. For example, the use of a protocol for real-time or near real-time communication can allow the process of sending the asset 204 from the client application 128a, notifying the client application 128b, and retrieving the asset from the server-based clipboard 206 to be performed in 1-2 seconds. A non-limiting example of a notification message is an Extensible Messaging and Presence Protocol (XMPP) message.

The client application 128b can initiate a paste operation from the server-based clipboard 206 in response to receiving input data 201b. The input data 201b can be generated in response to a touch input by the input device 103 or another device to a computing device at which the client application 128a is executing, such as the computing device 104b. The client application 128b can retrieve the asset 204' from the server-based clipboard 206 by transmitting a request 216 for the asset and receiving data 210b representing the copied asset 204'. In an embodiment, the asset 204' is transmitted from the server-based clipboard 206 to the destination or requesting client application 128b as serialized data 210b. The request 216 can include the identifier 302 received as part of the input data 201b from the input device. Retrieving the asset 204' can include using and/or storing the copied asset 204" received from the cloud application 116 via serialized data 210b in a local memory. For example, a client application 128b executed on a computing device 104b can configure a processor 118b to store the asset in the memory 120b.

Figure 5:
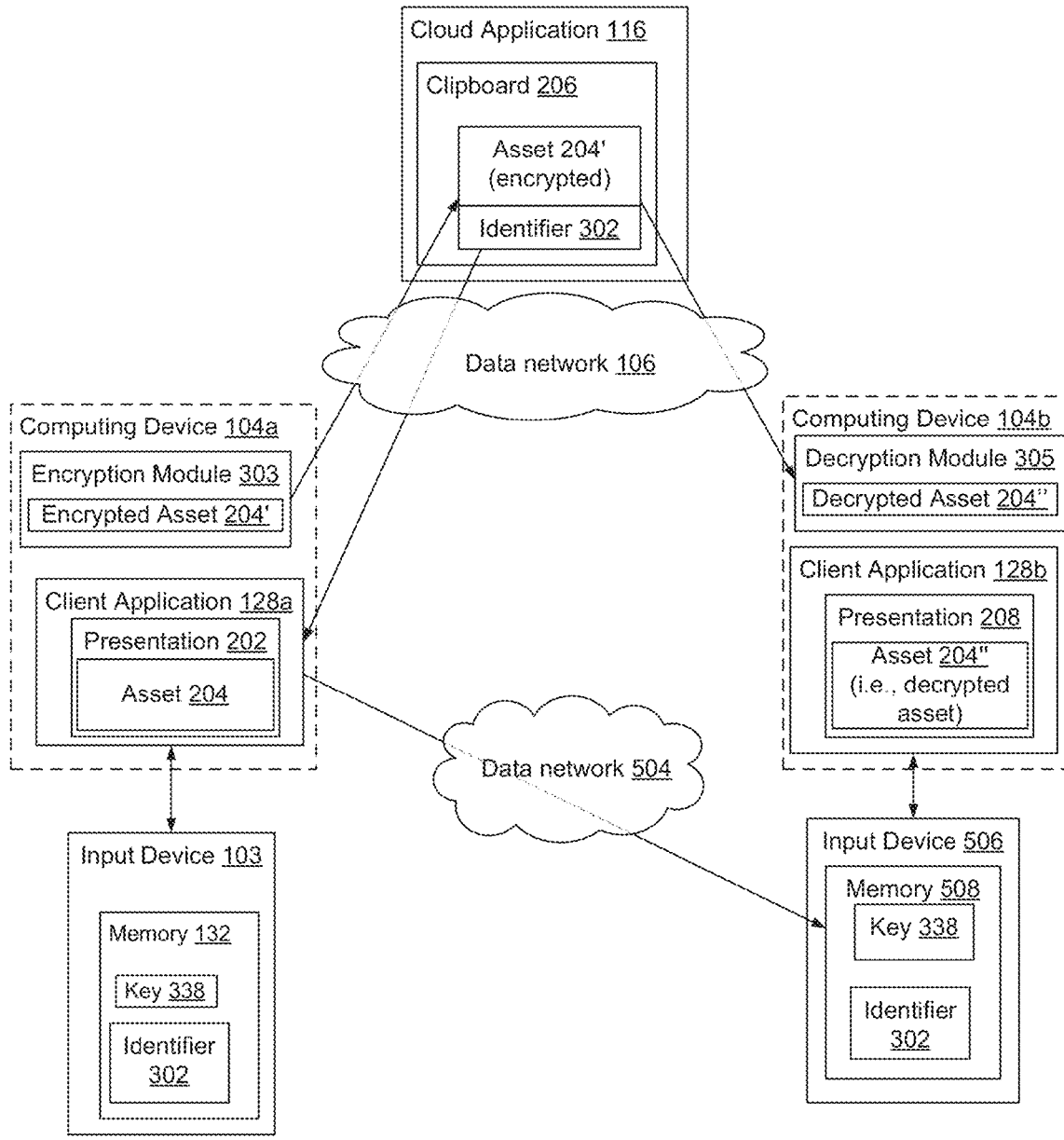
FIG. 5 is a block diagram depicting communication flows between a computing device copying an asset to a server-based clipboard and providing a reference to a network location of the copied asset to a second computing device, in accordance with embodiments.

In cases where the copied asset 204' in the server-based clipboard 206 is in an encrypted form, the client application 128b (or a computing device at which the client application 128a is executing, such as the computing device 104b), can invoke a decryption module 305 to decrypt the copied asset 204' to produce a decrypted copy of the asset 204". In this example, the decryption key 338 will be received from the input device 103 as part of the input data 201b to the client application 128b. While the decryption module 305 is depicted as part of the client application 128b in the exemplary embodiment of FIG. 3, in alternative embodiments, the decryption module 305 can be external to the client application 128b. For example, the decryption module 305 can be a separate application or part of an application library elsewhere on computing device at which the client application 128b is executing, such as the computing device 104b. The decryption module 305 discussed below with reference to FIG. 5 is one example of such an implementation where the decryption module 305 is not part of the client application 128b.

The cloud application 116 and the client application 128b can communicate the notification message 214, the request 216, and the serialized data 210b via a connection between the client application 128b and the cloud application 116 over a data network 106. In some embodiments, a first connection over the data network 106 between the client application 128a and the cloud application 116 can be active during at least some of the same time period that a second connection over the data network 106 between the client application 128a and the cloud application 116 is active. In other embodiments, a first connection between the client application 128a and the cloud application 116 can be active during a different time period than when a second connection over the data network 106 between the client application 128a and the cloud application 116 is active.

With continued reference to FIG. 3, in additional or alternative embodiments, the client application 128a can include a time stamp 212 with the copied asset 204'. The time stamp 212 can be used to identify a time and/or date associated with the client application 128a copying the asset 204 to the server-based clipboard 206 as asset 204'. In some embodiments, the client application 128a can transmit the time stamp 212 to the cloud application 116 in the serialized data 210a. In other embodiments, the cloud application 116 can generate the time stamp 212 in response to the cloud application 116 receiving the serialized data 210a. Information uniquely identifying the asset 204' can comprise the time stamp 212. That is, in an embodiment, the identifier 302 can incorporate the time stamp 212. The asset 204' can be stored in the server-based clipboard 206 with the time stamp 212. In some embodiments, the client application 128b may be able to access a local clipboard 218 having a local time stamp 220. The client application 128b can determine that the local time stamp 220 is older than the time stamp 212 retrieved from the cloud application. The comparison of the time stamp 212 and the local time stamp 220 may be performed in response to a pasting operation executed by the client application 128b in response to an input from the input device 103. The client application 128b can select the asset 204' for pasting into the client application 128b based on the time stamp 212 indicating a more recent time and/or date than the local time stamp 220. In additional or alternative embodiments, the client application 128b can overwrite data stored in the local clipboard 218 with the asset 204" retrieved from the server-based clipboard 206 based on the time stamp 212 indicating a more recent time and/or date than the local time stamp 220.

According to embodiments, a computing device where the client application 128b is executing or the client application 128b can determine whether to retrieve a requested asset from the computing device's local clipboard 218 or from the server-based clipboard 206. As discussed above with reference to FIG. 3, both of the client applications 128a, 128b can be executed on a common computing device (e.g., a single computing device 104a). In certain embodiments, if the requested asset 204 is already in the local clipboard 218 (i.e., as a result of a previous copy operation performed on the destination computing device 104a), and the asset 204 in the local clipboard 218 is usable by the target client application 128b, a copy of the asset 204' need not be retrieved from the server-based clipboard 206 and can instead be retrieved from the local clipboard 218.

In an embodiment, the local clipboard 218 can be a local clipboard used by a single computing device 104a for multiple client applications 128a and 128b. The local clipboard 218 may be implemented as an application agnostic clipboard usable for cross-application copy/paste operations on the computing device 104a. In embodiments, the determination as to whether to retrieve a requested asset from the local clipboard 218 or the sever-based clipboard 206 can be based on input received at the client application 128b, including input from the input device 103. The request for an asset 204 to be pasted into the client application 128b can indicate information identifying the source computing device and/or a platform where a copy operation for the requested asset occurred. According to embodiments, the information identifying the computing device can include the MAC address and/or the IP address of the computing device where the copy operation for the asset 204 was initiated. In embodiments, the platform information can identify one or more of the source client application that the asset 204 was copied from (i.e., the source or copying client application 128a), an operating system (OS) of the source computing device, and applications installed on the source computing device. Based at least in part on one or more the platform information (i.e., information identifying the source application 128a) and the information identifying the source computing device, the destination computing device (i.e., 104a) can determine if the asset 204 can be provided to the target client application 128b from the local clipboard 218 of the destination computing device 104a or needs to be retrieved from the cloud-based clipboard 206. In response to determining that the requested asset 204 can be provided to the client application 128b from the local clipboard 218 of the computing device 104a, the asset is retrieved from the local clipboard 218. Alternatively, if it has been determined that the requested asset 204 cannot be provided to the client application 128b from the local clipboard 218, a copy of the asset 204' is retrieved from the server-based clipboard 206. In environments where security is a concern and/or when a secure cloud-based clipboard is being used, an encrypted copy 204' of the requested asset will be retrieved from the server-based clipboard 206.

Although FIG. 3 depicts the client application 128b pasting the asset 204" into a pre-existing presentation 208, other implementations are possible. For example, the client application 128b can generate a new presentation in response to the input data 201b being received. The asset 204" retrieved from the clipboard can be pasted into the new presentation. Assets may be used in presentations and/or other types of electronic content.

In some embodiments, the cloud application 116 can perform one or more operations on the copied asset 204' before providing the asset 204" to the client application 128b. Examples of such operations are discussed below with reference to FIG. 4.

Exemplary Method for Providing a Secure Cloud-Based Clipboard

Figure 4:
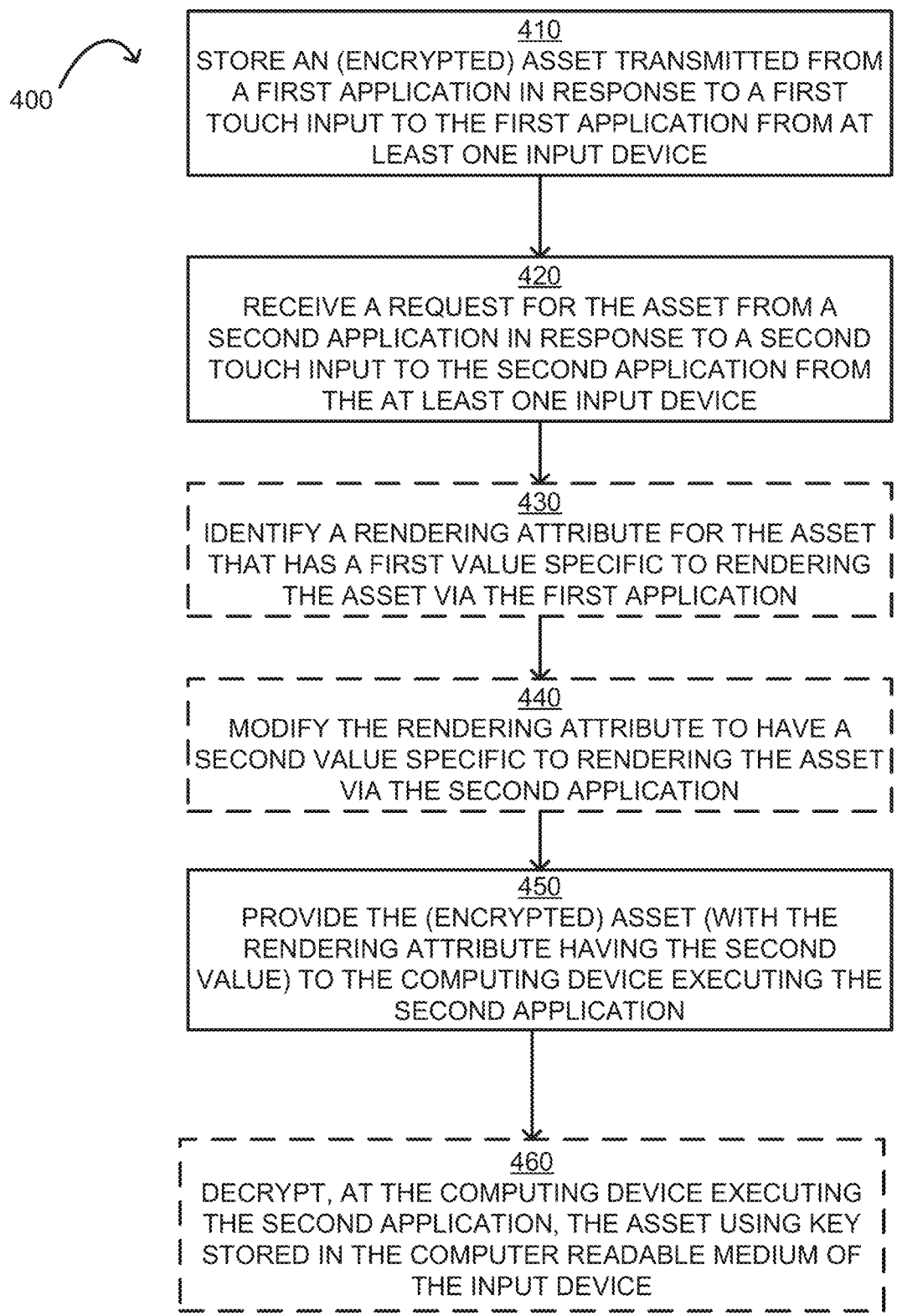
FIG. 4 is a flow chart illustrating an exemplary method for providing a secure cloud-based clipboard.

FIG. 4 is a flow chart illustrating an exemplary method 400 for providing a secure server-based clipboard (i.e., a secure cloud-based clipboard). For illustrative purposes, the method 400 is described with reference to the system implementations depicted in FIG. 2 and the flow of communication depicted in FIG. 3. Other implementations, however, are possible. The steps of the method 400 do not necessarily have to occur in the order shown in FIG. 4 and described below. According to embodiments, some of the steps shown in FIG. 4 are optional. Optional steps or optional portions of steps are indicated in the flowchart by parenthetical phrases and dashed lines (see, e.g., steps 410, 440, 450, and 460 pertaining to encryption/decryption and rendering attribute features).

Beginning with step 410, the method 400 stores an asset transmitted from a first application in response to a first touch input or other input to the first application from at least one input device. For example, the processor 105 of the server system 102 can execute the cloud application 116 to store an asset transmitted to the server system 102 from a client application 128a in response to a touch input or other input to the client application 128a from the input device 103. As shown in FIG. 4, in certain embodiments, the asset stored in step 410 can be an encrypted asset, such as a copied asset 204' having been encrypted by an encryption module 303. Step 410 can also comprise creating an identifier 302 for the stored asset 204' and storing the identifier 302 in a cloud-based clipboard 206 provided by the cloud application 116. As discussed above with regard to FIG. 3, the identifier 302 can be communicated to an input device 103 that initiated a copy operation for the asset 204' via a computing device (e.g., computing device 104a) where the first application (e.g., client application 128a) is executing so that the identifier can be stored in the input device 103. After the asset is stored, control is passed to step 420.

In step 420, a request for the asset is received from a second application in response to a second touch input or other input to the second application from the input device.

For example, this step can comprise the cloud application 116 receiving a request from a client application 128b in response to a touch input or other input to the client application 128b from the input device 103. In an embodiment, the request received in this step includes the identifier 302, which was received from the input device at the client application 128b.

In optional step 430, a rendering attribute is identified for the asset having a first value that is specific to rendering the asset via the first application. As the cloud application 116 may not be able to determine values for rendering attributes of an encrypted asset, steps 430-450 may require metadata or other data associated with the encrypted asset in order to be carried out. For example, metadata or other information pertaining to a rendering attribute for an encrypted, copied asset 204' stored in step 410 can be sent to the cloud application 116 as part of the serialized data 210a shown in FIG. 3. In this embodiment, step 430 can identify a first value of the encrypted asset's rendering attribute that is specific to rendering the asset via the first application based on metadata instead of data within the encrypted, copied asset 204'.

Alternatively, if an encrypted copied asset 204' is stored in step 410 and no metadata or other information regarding at least one rendering attribute for the asset 204' is available to the cloud application 116, portions of one or more of steps 430-450 pertaining to modifying a rendering attribute may be bypassed. In certain embodiments, rendering attribute modification need not occur at the cloud application 116 or at all. The copied asset 204' may be provided without modification and used on the destination computing device without modification. Alternatively, modification of rendering attributes may be performed at a destination computing device where the second application is running instead of being performed by a server hosting the cloud application 116. For example, when a copy asset 204' is in encrypted form, a computing device 104b where a destination client application 128b is executing may perform some or all of steps 430-450 after the encrypted asset is provided to the computing device 104b in step 450 and after the asset is decrypted by the decryption module 305 on the computing device 104b.

For example, step 430 can comprise the cloud application 116 identifying a rendering attribute of the asset 204 specific to the rendering of the asset 204 by the client application 128a. In some embodiments, the cloud application 116 can identify the rendering attribute having the first value based on metadata describing the asset 204. Metadata describing the asset 204 can be transmitted to the cloud application 116 in the serialized data 210a. For example, the metadata can identify rendering attributes such as the dimensions or resolution of a display device 126a on which the asset 204 is rendered by the source or copying client application 128a, one or more color values for the asset 204, an operating system (OS) of the computing device 104a at which the source or copying client application 128a is executed, a type of graphical object or graphical data (e.g., vector or raster) used by the client application 128a, etc. After the rendering attribute is identified, control is passed to optional step 440.

In optional step 440, the rendering attribute is modified to have a second value that is specific to rendering the asset via the second application. For example, this step can be performed by the cloud application 116 modifying the rendering attribute to have a value specific to the rendering of the asset 204 by the client application 128b. In some embodiments, the rendering attribute includes a scaling factor.

Figure 8:
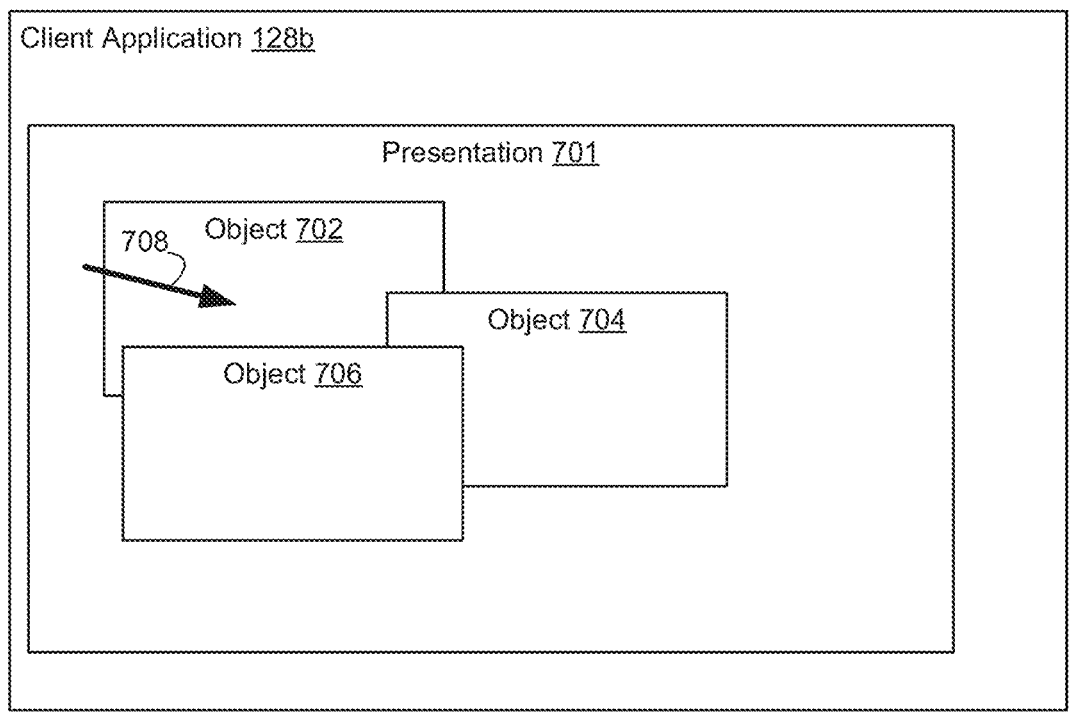
FIG. 8 is a modeling diagram depicting selection of a layer of a presentation into which an asset may be pasted.
Figure 9:
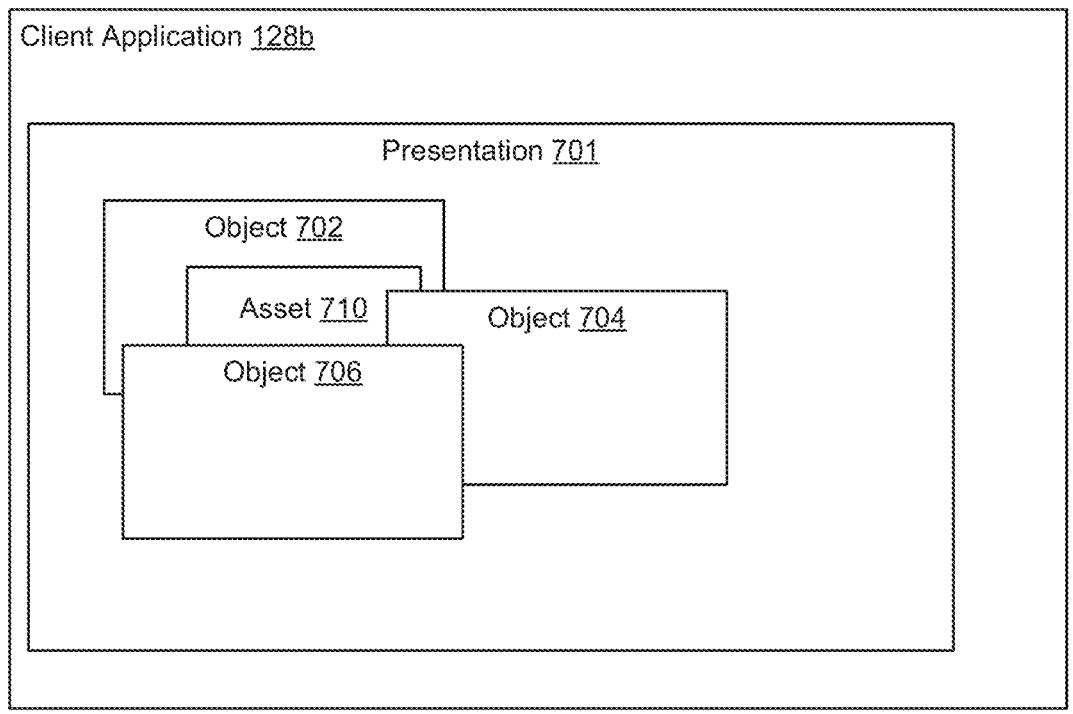
FIG. 9 is a modeling diagram depicting pasting an asset into a selected layer.

According to these embodiments, the first value can be a first scaling value of the scaling factor used by a first application, such as the client application 128a, to render the asset 204 for display, and the second value can be a second scaling value of the scaling factor that is used by a second application, such as the client application 128a, to render the asset 204 for display. In additional or alternative embodiments, the rendering attribute can include a color attribute of the asset, a resolution, and a display dimension. In non-limiting examples, the rendering attribute modified in step 450 can be based on a resolution or dimension of a display screen, such as a height and/or width. In embodiments, a plurality of rendering attributes are used and step 440 is repeated as needed to modify the plurality of rendering attributes to have respective second values specific to rendering the asset via the second application. Step 440 can also modify attributes related to rendering the asset at a target location in an interface of the second application. For example, a target location can be a location indicated, via input device 103, as to where a copied asset 204' is to be pasted. Additionally, step 440 can modify an attribute relating to a layer of a presentation of the second application into which the asset is to be pasted. Examples of layers of a presentation 701 are shown in FIGS. 8 and 9. As described below with reference to FIG. 7, the target location for an asset to be pasted can be conceptualized as a rendering attribute whose values include converted/scaled x, y coordinates in an x-y plane corresponding to a screen of the target display device 126b. Additional non-limiting examples of rendering attributes and modifications of their values are described in commonly assigned U.S. Pat. No. 9,467,495, issued on Oct. 11, 2016, and entitled "Transferring Assets via a Server-Based Clipboard," by Memon et al. After the rendering attribute is modified, control is passed to step 450.

In step 450, the asset is provided to the second application. The provided asset can have the rendering attribute with the second value specific to the second application. For example, the cloud application 116 can provide the copied asset 204' with the rendering attribute as modified by the cloud application 116 to the client application 128b. As shown in FIG. 4, if the asset stored in step 410 was encrypted, the asset provided in step 450 will be in encrypted form. For example, if an encrypted copy of an asset 204' was received in step 410, that encrypted asset will be provided in step 450 to the computing device (i.e., computing device 104b) executing the second application (i.e., client application 128b). In such cases where the asset 204 has been previously encrypted (i.e., by the encryption module 303) prior to storing the encrypted, copied asset 204' in step 410, control is passed to optional step 460.

In optional step 460, the asset is decrypted. In the example embodiment of FIG. 4, step 460 is performed at the computing device executing the second application (e.g., computing device 104b) and the decryption is performed using the key stored in the computer readable medium of the input device (e.g., the key 338 stored in memory 132 of the input device 103).

Exemplary Data Flows for Securely Transferring Assets Between Input Devices

Exemplary communications for transferring an asset between multiple input devices are illustrated in FIG. 5. As shown in FIG. 5, a computing device performing copy operations can provide an asset to a server-based clipboard 206 (i.e., cloud-based clipboard) and notify neighboring devices, including other input devices, of the location of the asset on the clipboard. By encrypting the assets provided to the server-based clipboard 206 and/or using secure communication links to transmit copied assets to the server-based clipboard 206 via data network 106, assets can be shared amongst multiple input devices in a secure manner. FIG. 5 is described with continued reference to the embodiments illustrated in FIGS. 2 and 3.

FIG. 5 illustrates data flows for exemplary secure cross-application and cross-device copy/paste operations involving multiple input devices, client applications, and computing devices. However, FIG. 5 is not limited to those embodiments. In particular, FIG. 5 is a diagram depicting data/communication flows between a computing device 104a copying an asset 204 to a server-based clipboard 206 (i.e., a cloud-based clipboard) and providing an identifier 302 for the copied asset 204' to a second computing device 104b. In embodiments, the identifier 302 can be information uniquely identifying the asset, such as a network identifier, or a reference to the storage location of the asset in the server-based clipboard 206. A computing device 104a executing a client application 128a can copy an asset 204 to the server-based clipboard 206 in response to a touch input or other input from a first input device 103, as described above with respect to FIG. 3.

As shown in FIG. 5, the asset 204 can be copied to the server-based clipboard 206 via the data network 106. This data flow can be via a secure connection or link through the data network 106, such as, but not limited to, an SSL connection. The client application 128a can assign or alternatively obtain an identifier 302 for the asset 204', such as a network identifier or other unique identifier, from the server-based clipboard (or the cloud application 116 providing the server-based clipboard 206) after the copied asset 204' is stored in the server-based clipboard 206. The asset 204' can be stored at the server-based clipboard 206 at a storage location referenced by the identifier 302. A non-limiting example of an identifier for the asset 204' is a URL referencing a storage location of the copied asset 204' in a web server used as a cloud storage device for the server-based clipboard 206. In one embodiment, such a web server can be part of the server system 102 described above with reference to FIG. 2.

As described above with reference to FIG. 3 and shown in FIG. 5, the copied asset 204' can be an encrypted copied asset 204' that was encrypted by the encryption module 303 invoked by the computing device 104a prior to transmitting the asset 204 to the server-based clipboard 206. While the encryption module 303 is depicted as being separate from the client application 128a in FIG. 5, in alternative embodiments, the encryption module 303 can be a module included in the client application 128a (see, e.g., the encryption module 303 in FIG. 3). If the asset 204 is encrypted before being copied to the clipboard 206, the decryption key 338 usable to decrypt the encrypted asset 204' is transmitted to the input device 103 and stored in the memory 132 of the input device 103. The decryption key 338 can be communicated wirelessly between the computing device 104a and the wireless transceiver 136 of the input device 103 described above with reference to FIG. 2. In one embodiment, the decryption key 338 is stored also in a key store (not shown) on the computing device 104a, either as part of the encryption module 303, or elsewhere.

As shown in FIG. 5, the computing device 104a can also access a second data network 504, such as (but not limited to) a Bluetooth or other wireless network. The client application 128a can cause the computing device 104a to scan the data network 504 to discover or otherwise identify other input devices, such as an input device 506. The input device 506 can communicate with other computing devices, such as the computing device 104b executing a client application 128b. The client application 128a can provide identifier 302 for the asset 204' to the input device 506 via the data network 504. Providing the identifier 302 for the copied asset 204' can include, for example, writing the identifier 302 to a local memory 508 of the input device 506. In some embodiments, the client application 128a can provide the identifier 302 obtained from the input device 103 to the input device 506 via a connection over the data network 504 between the computing device 104a and the input device 506. In other embodiments, the client application 128a can provide the identifier 302 to the input device 506 via a wireless connection between the input device 506 and a network communication device of the computing device 104a, such as a wireless network transceiver. FIG. 5 also shows that, in cases where a copied asset 204' stored in the server-based clipboard 206 is encrypted; the computing device 104a can provide the decryption key 338 obtained from the input device 103 to the input device 506 via a connection over the data network 504 between the computing device 104a and the input device 506. Although FIG. 5 depicts providing the identifier 302 and the decryption key 338 for a copied asset 204' to a single discovered input device 506, the identifier 302 and key 338 for an encrypted, copied asset 204' can be provided to any number of additional input devices that can be discovered or otherwise identified on a wireless network.

Any suitable process can be used for retrieving the asset via the identifier 302 provided by an application performing a copying operation. As shown in FIG. 5, in embodiments where the copied asset 204' stored in the server-based clipboard 206 is in encrypted form, the decryption module 305 is invoked on the computing device 104b to decrypt the asset 204' and produce a decrypted asset 204". According to these embodiments, the decryption key 338 can be obtained from the memory 508 of the input device and used by the decryption module 305 for decrypting the asset 204' retrieved from the server-based clipboard 206. In other embodiments where the copied asset 204' is not in encrypted form, the identifier 302 can be communicated to other discoverable computing devices and/or discoverable input devices, which can then initiate paste operations for the unencrypted asset 204' stored in the server-based clipboard 206.

Figure 6:
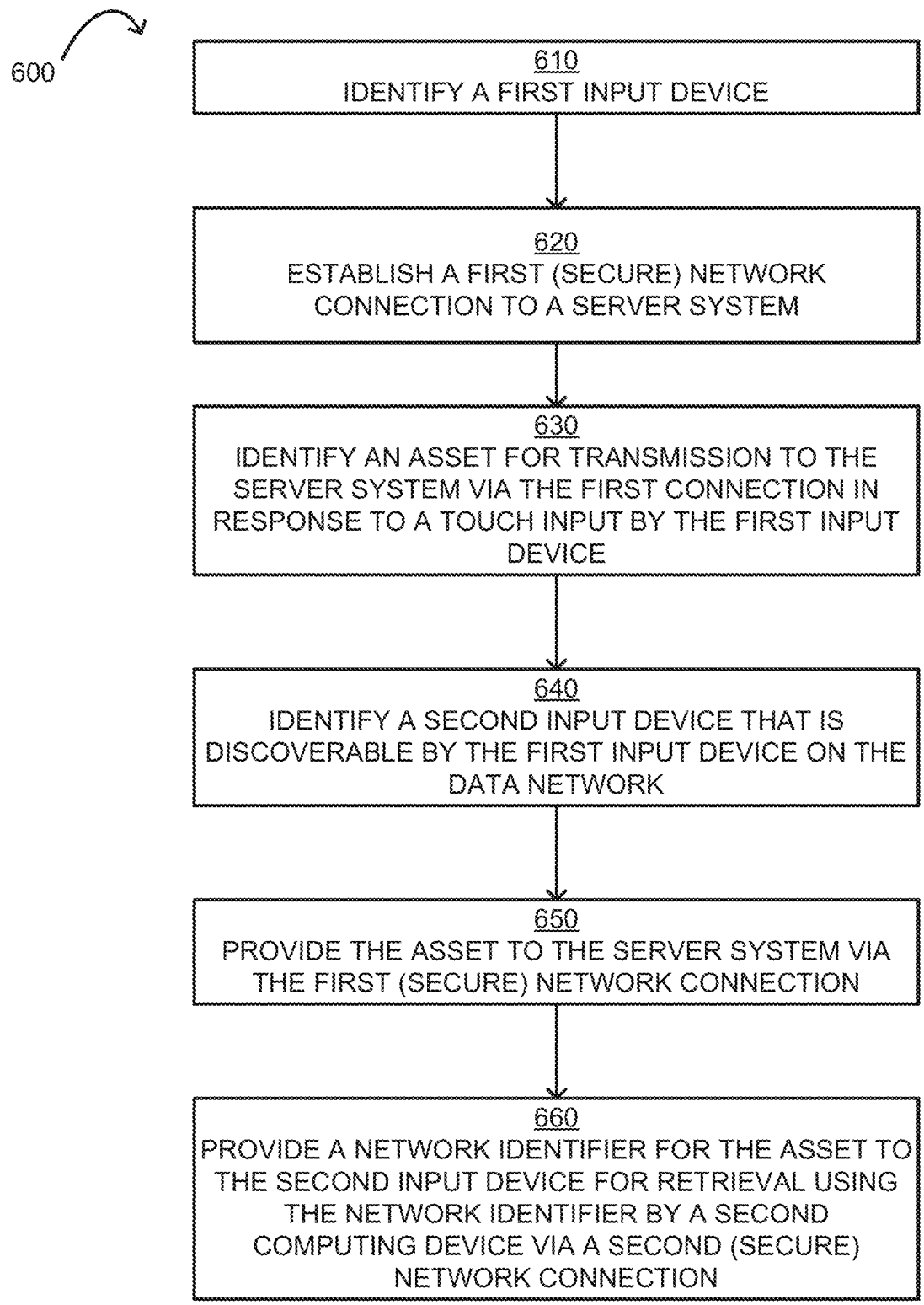
FIG. 6 is a flow chart illustrating an exemplary method for providing assets or other electronic content to a server-based clipboard.

In some embodiments, the cloud application 116 may verify that the client application 128b is authorized to retrieve the asset from the server-based clipboard 206 based on the computing device 104b having the identifier 302 and/or the decryption key 338. For example, the computing device 104b may obtain the identifier 302 and/or the decryption key 338 from the input device 506 via a touch input or other input from the input device 506 initiating a pasting operation. The client application 128b executing on the computing device 104b may request the copied asset 204' from the server-based clipboard 206 in response to the touch input or other input from the input device 506. The request for the asset 204' includes the identifier 302 whether the asset 204' is encrypted or not. The cloud application 116 may verify that the client application 128b is authorized to retrieve the asset from the server-based clipboard 206 based on the client application 128b providing the identifier 302 in the request for the asset Exemplary Method for Sharing Assets Using a Cloud-Based Clipboard FIG. 6 is a flow chart illustrating an example method 600 for providing and sharing assets or other electronic content using a server-based clipboard (i.e., a cloud-based clipboard). For illustrative purposes, the method 600 is described with reference to the system implementations depicted in FIG. 2 and the data/communication flows depicted in FIGS. 3 and 5. Other implementations, however, are possible. Optional portions of steps are indicated in the flowchart by parenthetical phrases (see, e.g., steps 620, 650, and 660 pertaining to security features).

The method 600 begins in step 610 where a first input device in communication with a computing device is identified. The identification of an input device in step 610 can be conceptualized as a pairing operation between a wireless input device, such as a stylus, and a touch computing device. Such pairing or identification can be accomplished via a Bluetooth discovery process. This step can comprise a client application 128a executing on a computing device 104a identifying an input device 103 that is in communication with the computing device 104a. The communication between the input device 103 and the computing device 104a may be via a Bluetooth connection or another wireless connection between the computing device 104a and the input device 103. After the input device is identified or discovered, control is passed to step 620.

In step 620, a first network connection is established between a server system and the computing device. For example, this step can comprise establishing a connection between the client application 128a and a server system 102 hosting the cloud application 116. The connection can be via a data network 106. As shown in FIG. 6, in one embodiment, the network connection can be a secure connection. One non-limiting example of such a secure connection is an SSL connection to the server system 102. After the first network connection is established, control is passed to step 630.

Next, in step 630, the method 600 identifies an asset for transmission to the server system via the first connection. The identified asset is rendered by a first application executed at the computing device. For example, as described above with respect to FIG. 3, the client application 128a executing on the computing device 104a can receive a touch input or other input from the input device 103. The touch input or other input can identify an asset 204 to be copied to the server-based clipboard 206 provided by the cloud application 116.

The method 600 further involves identifying a second input device that is discoverable by the first input device on the data network, as shown in step 640. For example, the client application 128a executing on the computing device 104a can scan a data network 504 to discover or otherwise identify additional an additional input devices, such as an input device 506, accessible via the data network 504.

The input device 506 can be discovered or otherwise identified by any suitable device or process. In some embodiments, the client application 128a or another application executing on the computing device 104a can identify the input device 506 by identifying a second computing device 104b accessing the data network 504 and determining that the input device 506 is in communication with the computing device 104b. In other embodiments, the client application 128a or another application executing on the computing device 104a can identify the input device 506 by determining that the input device 506 accessing the data network 504 without regard to whether a computing device 104b or other computing device in communication with the input device 506 is accessing the data network 504. For example, the input device 506 may be configured to broadcast or otherwise transmit its presence to other input devices and/or other computing devices via a Bluetooth network or other personal area network. In other embodiments, the input device 103 can discover or otherwise identify the input device 506. In one example, the input device 103 can notify the client application 128a or another application executed on the computing device 104a that the input device 506 is available in response to a query to the input device 103 from the computing device 104a. In one example, the input device 103 can "push" a notification to the client application 128a or another application executed on the computing device 104a that the input device 506 is available without a query from the computing device 104a.

In some embodiments, identifying the input device 506 can include obtaining a network identifier other unique identifier for one or more computing devices in communication with the second input device, such as a computing device 104b. One non-limiting example of a network identifier is a URL identifying a client application 128b executed on a computing device 104b that is in communication with the second input device. Another non-limiting example of a network identifier is a media access control (MAC) address for the input device 506. Another non-limiting example of a network identifier is an internet protocol (IP) address or MAC address for the computing device 104b that is in communication with the input device 506.

The method 600 further involves providing the asset to the server system via the first connection, as shown in step 650. For example, the client application 128a executing on the computing device 104a can transmit the asset 204 to the cloud application 116 as described above with respect to FIG. 3. As shown in FIG. 6, step 650 can provide the asset in step 650 using the first, secure connection established in step 620. The client application 128a can obtain a reference or network identifier 302 for the asset 204' as stored on the server-based clipboard 206.

The method 600 further involves providing a network identifier for the asset to the second input device, as shown in step 660. The asset is retrievable using the network identifier by a second computing device in communication with the second input device via a second connection. For example, the client application 128a executing on the computing device 104a can provide a network identifier 302 to the input device 506 as described above with respect to FIG. 5.

One or more of steps 630-660 can be performed in responsive to the touch input or other input by the input device 103.

Exemplary Method for Retrieving Assets from a Secure Cloud-Based Clipboard

Figure 7:
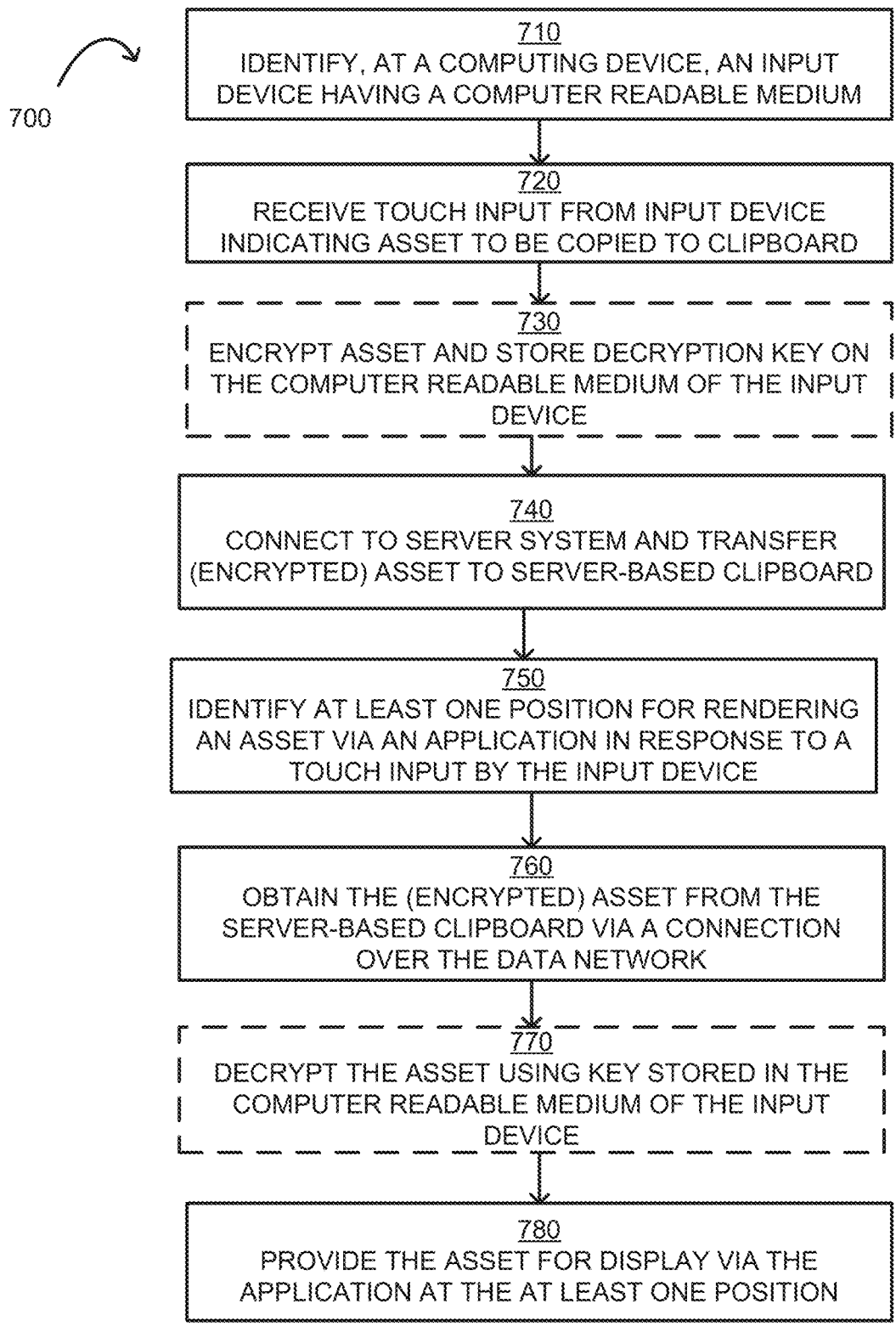
FIG. 7 is a flow chart illustrating an exemplary method for retrieving assets or other electronic content from a secure cloud-based clipboard.

FIG. 7 is a flow chart illustrating an example method 700 for retrieving assets or other electronic content from a server-based clipboard. For illustrative purposes, the method 700 is described with reference to the system implementations depicted in FIG. 2 and the data/communication flows depicted in FIGS. 3 and 5. Other implementations, however, are possible. Optional steps or optional portions of steps are indicated in the flowchart by parenthetical phrases and dashed lines (see, e.g., steps 730, 740, 760, and 770 pertaining to encryption and decryption features).

The method 700 involves identifying an input device in communication with a computing device, as shown in step 710. For example, a client application 128b executing on a computing device 104b can identify an input device 103 in communication with the computing device 104b. As shown in FIG. 7, the input device identified in step 710 has a computer readable medium. In embodiments, the computer readable medium is the memory 132 of input device 103 or the memory 508 of the input device 506 shown in FIG. 5.

After the input device is identified, control is passed to step 720.

Next, in step 720, an input is received from the input device identified in step 710. As shown in FIG. 7, the input received in this step can be a touch input indicating an asset to be copied to a clipboard (i.e., a copy command). In embodiments, step 720 can comprise receiving a touch input from an input device 103 indicating an asset 204 to be copied to a server-based clipboard 206 provided by a cloud application 116. After the input is received, control is optionally passed to step 730 in embodiments where the asset is encrypted for use in a secure cloud-based clipboard. Otherwise, control is passed to step 740.

In optional step 730, the asset is encrypted and a decryption key usable to decrypt the encrypted asset is stored in the computer readable medium of the input device identified in step 710. Step 730 can be carried out by the encryption module 303 in order to produce an encrypted copy of the asset, which is transferred to the clipboard 206 as copied asset 204' in step 740. If step 730 is performed, a decryption key usable to subsequently decrypt the encrypted asset 204' is transmitted to the input device 103 that was identified in step 710 and saved in the input device's computer readable medium. For example, step 730 can comprise storing the decryption key 338 the memory 132 of the input device 103. After the asset is encrypted, control is passed to step 740.

In step 740, the asset is transferred to a server-based clipboard. This step can comprise transferring an asset 204 to cloud storage used by the server-based clipboard 206. The asset transferred in step 740 will be encrypted if step 730 was performed. Alternatively the asset is transferred in unencrypted form. As part of step 740, a connection over a data network is established between the server system and the computing device. In an embodiment, this step comprises establishing a connection between a computing device 104b executing a client application 128b and a cloud application 116 executing on a server system 102. The connection can be via a data network 106. In embodiments, the connection can be a secure connection, such as, for example, an SSL connection. After the asset has been transferred to the server-based clipboard, control is passed to step 750.

The method 700 further involves identifying at least one position for rendering an asset via an application executed at the computing device, as shown in step 750. For example, step 750 can comprise receiving, a computing device executing the client application 128b, a touch input or other input from the input device 103. The received input can specify a paste operation to be performed by the client application 128b. The paste operation can add an asset 204' stored on the server-based clipboard 206 provided by the cloud application 116 to a document or other presentation being presented in an interface of the client application 128b. The client application 128b can identify a position for the asset 204' to be displayed in the document or other displayed presentation based on input received from the touch device. In some embodiments, the position for the asset 204' to be pasted and displayed can be determined based on a location of the touch input or other input on a display device of the computing device performing the pasting operation. For example, a touch input or other input at a given position in a plane provided by a display screen of the display device 126b can specify the position at which the asset 204 will be pasted in the client application 128b.

In other embodiments, the position for the asset 204 at a device or application performing a pasting operation can be determined based on a location of a touch input or other input at a device or application performing a copying operation. For example, the client application 128b can identify that the client application 128b is an active application based on input data 201b selecting the client application 128b. The client application 128b can identify the position of the input data 201a associated with a preceding copying operation performed in the client application 128a. For example, the client application 128b can request or otherwise retrieve data from the cloud application 116 identifying a position of the input data 201a that resulted in the copied asset 204' being stored to the server-based clipboard 206. In embodiments, such position data may be stored as metadata associated with the copied asset 204'. Such metadata can be stored in the server-based clipboard 206 or elsewhere in the server system 102. The client application 128b can determine a relationship between a first value of a rendering attribute for the asset 204 as displayed by the client application 128a and a second value of the rendering attribute for the asset 204'' as displayed by the client application 128b. The client application 128b can determine a position of the asset 204'' as rendered by the client application 128b based the relationship between the first and second values of the rendering attribute.

In one non-limiting example, the relationship between a first and second value of a rendering attribute can be a relationship between one or more dimensions of a display device 126a and one or more corresponding dimensions of the display device 126b. For example, the width of display device 126a may be one-third of the width of display device 126b and the height of display device 126a may be one-half of the height of display device 126b. The input data 201a may identify a point having coordinates (x, y) in an x-y plane corresponding to a screen of the display device 126a. A point having coordinates (x, y) on the display device 126a may correspond to a point having coordinates (3x, 2y) on the display device 126b based on the display device 126b having a screen that is thrice as wide and twice as tall as the display screen of the display device 126a.

In some embodiments, the position for the asset 204 can include a position in a plane corresponding to a touch surface provided by the display device 126b. In one non-limiting example, the position can be a position in an X-Y plane corresponding to a touch surface provided by the display device 126b. In another non-limiting example, the position can be a position in a three-dimensional touch volume provided by the display device 126b. After the at least one position is identified, control is passed to step 760.

In step 760, the asset is obtained from the server system via the connection over the data network. In an embodiment, this step involves a client application 128b can retrieving a copy of the asset 204' stored on the server-based clipboard 206 provided by the cloud application 116. As shown in FIG. 7, the copied asset 204' obtained from the server-based clipboard may be in encrypted form. If this is the case, control is passed to step 770 where the asset 204' is decrypted. Otherwise, control is passed to step 780 where the asset is provided for display.

In optional step 770, the asset is decrypted. In the example embodiment of FIG. 7, step 760 is performed using the decryption key stored in the computer readable medium of the input device as part of step 730. In one embodiment, the decryption is performed by the decryption module 305 executing on the computing device executing the client application 128b (e.g., computing device 104b). For example, the copied asset 204' obtained from the server-based clipboard in step 760 can be decrypted using the key 338 in the computer readable medium of the input device (e.g., the key 338 stored in memory 132 of the input device 103). Performing step 770 produces a decrypted copy of the asset (e.g., asset 204" shown in FIGS. 3 and 5. After the asset is decrypted, control is passed to step 780.

The method 700 concludes in step 780 by providing the asset obtained from the server system for display via the application at the at least one position. In an example, step 780 includes rendering, by the client application 128b, the asset 204" retrieved from the clipboard for display in or with a document or other output presentation provided by the client application 128a. In some embodiments, the document or other output presentation can be a pre-existing document or other output presentation being accessed by the client application 128b. In other embodiments, the client application 128b can generate a new document or other output presentation that includes the asset 204.

As indicated in FIG. 7 and described above, one or more of steps 710, 720, and 750 can be performed in responsive to a touch input by the input device 103.

Exemplary Work Flows for Merging Assets from a Clipboard into a Presentation

In certain embodiments, an asset copied to a clipboard, such as the secure cloud-based clipboard discussed above, needs to be pasted into a specific target position and/or layer within an existing presentation being output by a destination client application. For example, a user, using the input device 103, may select a target position for an asset to be pasted from a clipboard and provide the asset to an existing presentation being displayed or output by a client application 128b. This selection can include selecting a layer in a document or other output presentation in which the asset to be pasted will be positioned. FIGS. 8-12 provide modeling diagrams depicting exemplary workflows for pasting an asset from a server-based clipboard into a selected layer of a presentation and merging an asset into a selected portion of a presentation.

FIG. 8 is a modeling diagram depicting selection of a layer of a presentation 701 into which an asset 204" may be pasted. The presentation 701 is an embodiment of the pre-existing presentation 208 of the client application 128b discussed above with reference to FIG. 3. The presentation 701 can include multiple layers. As shown in FIG. 8, the presentation 701 can include objects 702, 704, 706 positioned in the various layers. In the example of FIG. 8, the object 702 is positioned in a first layer. The object 704 is positioned in a second layer. Objects in the second layer overlap objects in the first layer, as depicted in FIG. 8 by the object 704 overlapping the object 702. The object 706 can be positioned in a third layer. Objects in the third layer overlap objects in the first layer and the second layer, as depicted in FIG. 8 by the object 706 overlapping the objects 702, 704. Although the example provided in FIG. 8 depicts three objects in three layers, it is to be understood that any number of layers having any number of objects can be used.

With continued reference to FIG. 8, the client application 128b can receive an input 708 selecting a layer in which an asset 204" may be positioned. For example, an input 708 (depicted as an arrow in FIG. 8) can identify a layer in which object 702 is positioned. As shown in FIG. 9, providing an asset 710 in response to a paste operation being initiated by the input 708 can cause the asset 710 to be positioned in the same layer as object 702.

In additional or alternative embodiments, different types of touch inputs can identify a layer in which an asset is to be positioned. For example, a first type of touch input (such as, but not limited to, a single tap of a stylus tip such as the stylus tip 1319 of FIG. 13) can be associated with a first layer. A second type of touch input (such as, but not limited to, a double tap) can be associated with a second layer. A third type of touch input (such as, but not limited to, a long press) can be associated with a third layer. The client application 128b can identify that the asset is to be positioned in the first, second, or third layer based on the touch input respectively being a single tap, a double tap, or a long press.

Figure 10:
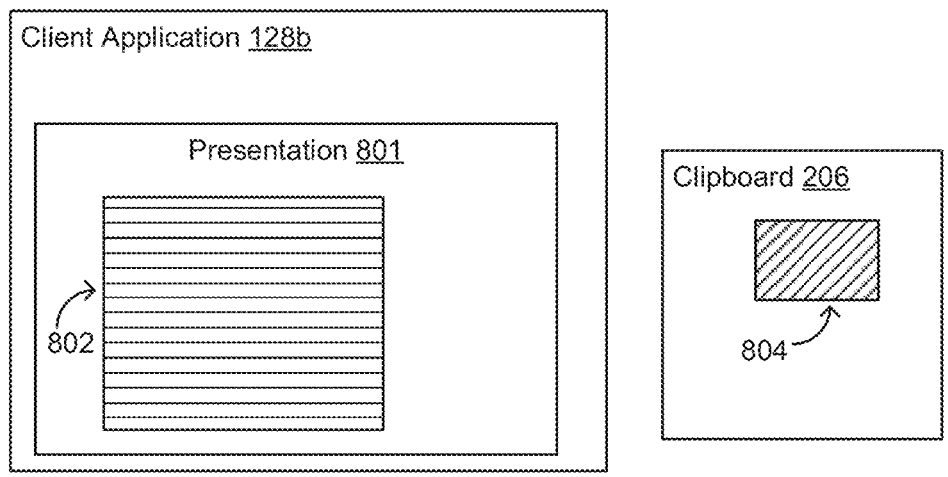
FIG. 10 is a modeling diagram depicting a presentation having content into which an asset from a server-based clipboard can be merged.
Figure 11:
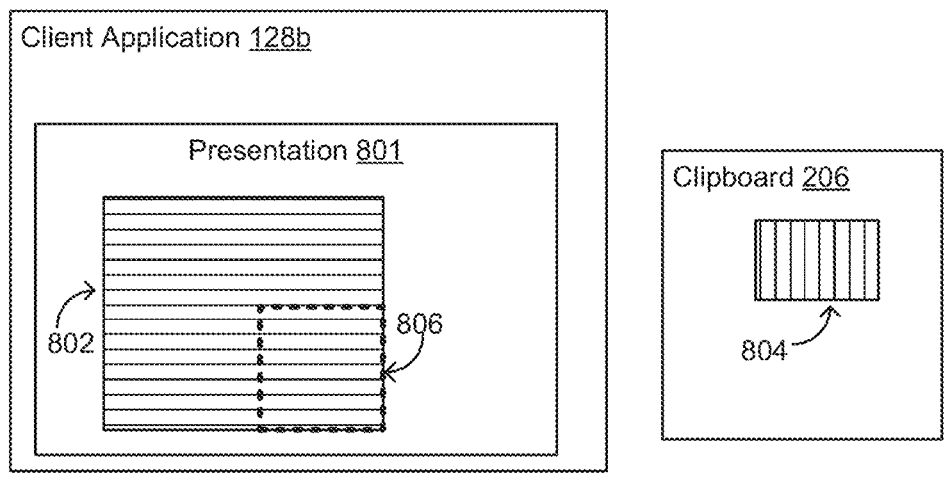
FIG. 11 is a modeling diagram depicting an input selecting a portion of content of a presentation into which an asset from a server-based clipboard can be merged.
Figure 12:
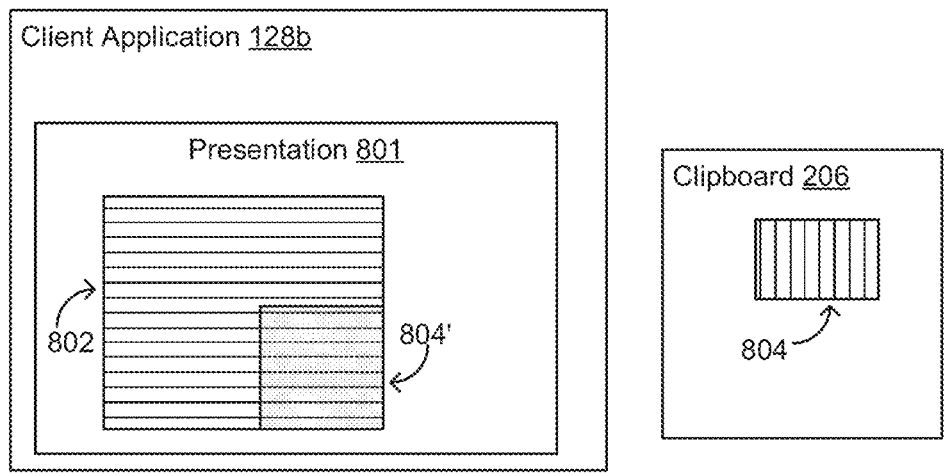
FIG. 12 is a modeling diagram of a copied asset generated from an asset being merged with content.

In embodiments, an application performing a paste operation from a server-based clipboard can merge an asset retrieved from the clipboard into an existing presentation, as depicted in FIGS. 10-12. FIG. 10 is a modeling diagram depicting a presentation 801 having content 802 into which an asset 804 from a server-based clipboard 206 can be merged. Identifying a position for rendering an asset 804 can include receiving an input specifying a portion of the content 802 into which the asset 804 can be merged. For example, FIG. 11 is a modeling diagram depicting a touch input 806 selecting a portion of the content 802 of the presentation 801 into which the asset 804 from a server-based clipboard 206 can be merged. The touch input 806 can involve drawing a border around a portion of the content 802 to be merged with the asset 804. For the sake of simplicity, the touch input 806 is depicted in FIG. 11 as a rectangular shape. However, the touch input 806 can specify any shape for the region of content 802 to be merged with the asset 804. FIG. 12 is a modeling diagram of a copied asset 804' generated from the asset 804 being merged with the content 802. The merging of content 802 in the selected region with the copied asset 804' is depicted in FIG. 12 by the vertical hatching of the asset 804 overlapping the horizontal hatching of the content 802. However, any form of merging content with an asset can be used.

In some embodiments, the cloud application 116 can be modify one or more attributes of the asset 804 in generating the copied asset 804". For example, as depicted in FIG. 12, the cloud application 116 can generate a copied asset 804" that is skewed in one or more dimensions and/or scaled in order to occupy a content region identified by the touch input 806 having different dimensions than the asset 804.

Exemplary User Interfaces for Transferring Assets Via a Cloud-Based Clipboard

Figure 13:
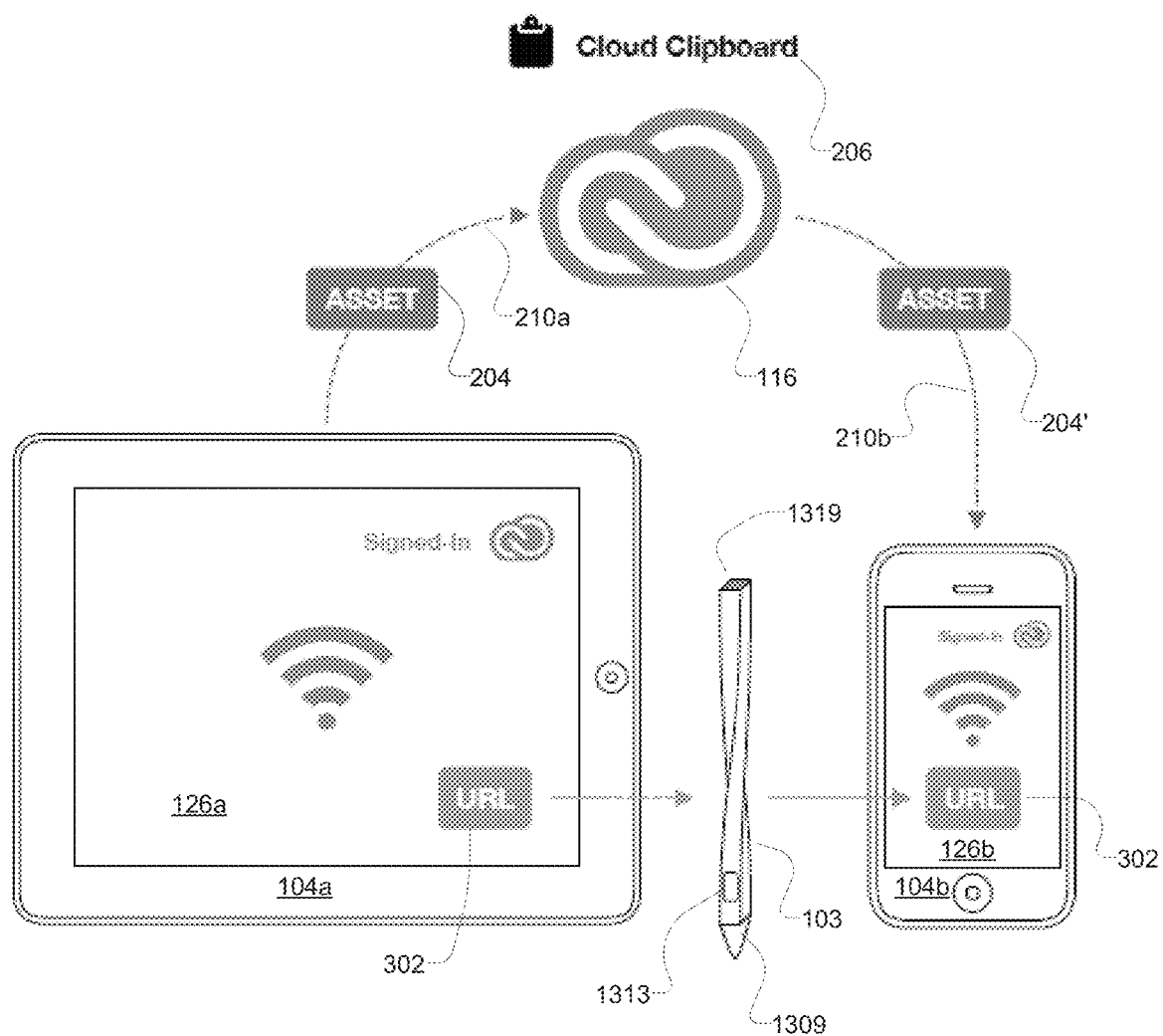
FIG. 13 illustrates communications flows for transferring an asset between a first touch computing device and second touch computing device via a cloud-based clipboard using an input device.
Figure 14:
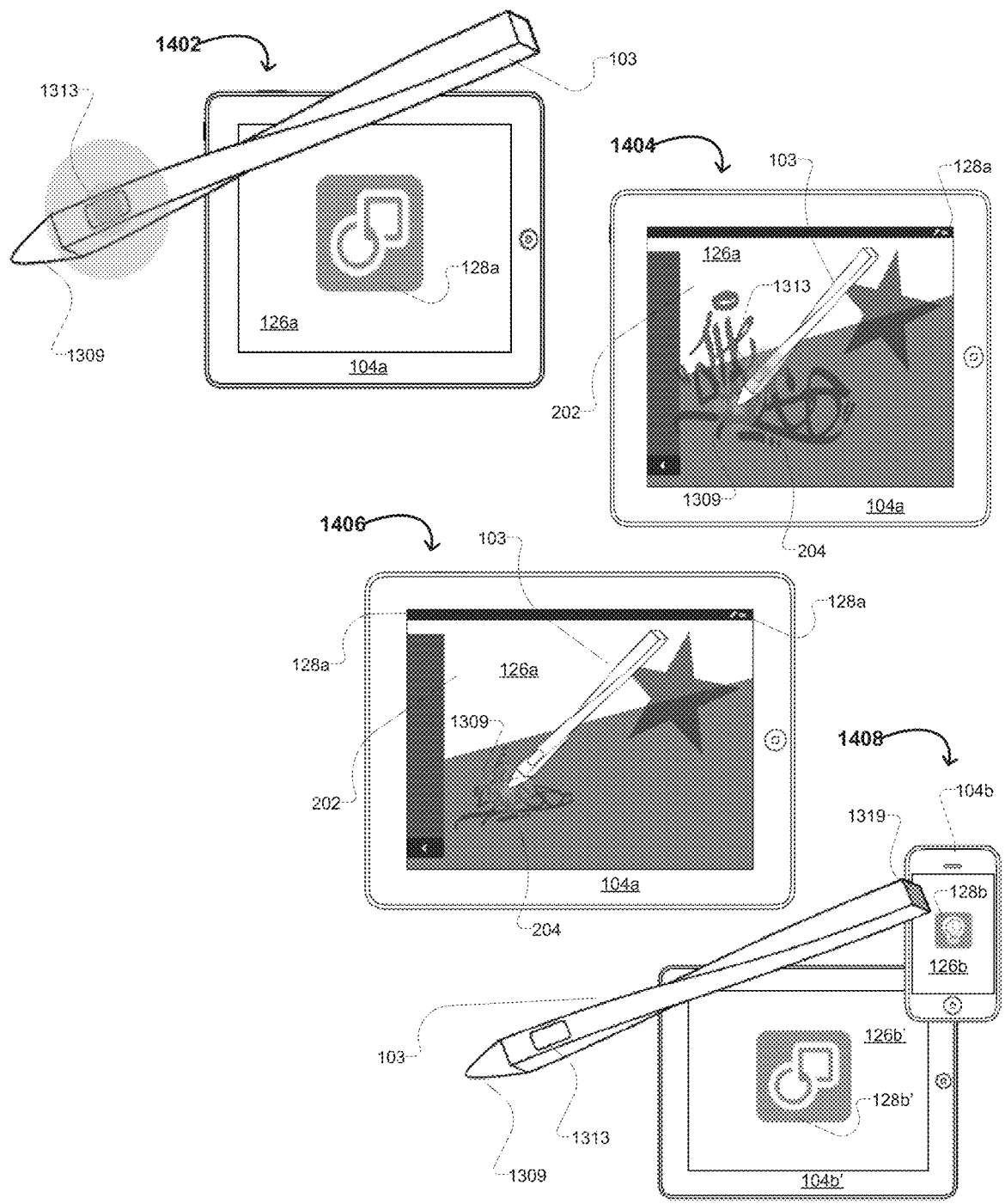
FIG. 14 depicts an exemplary workflow and user interface for copying an asset from a touch computing device using a stylus.
Figure 15:
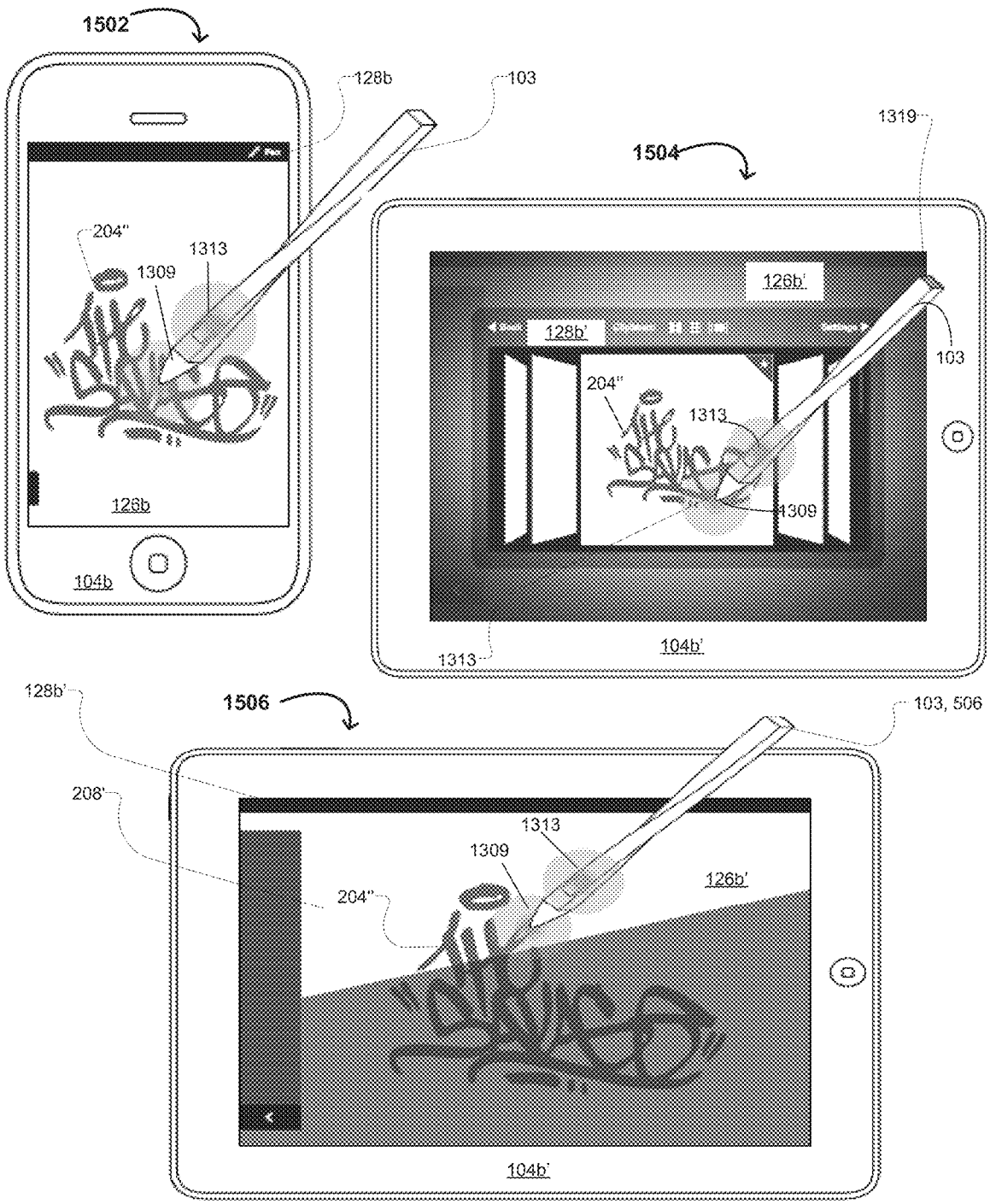
FIG. 15 depicts exemplary workflows and user interfaces for pasting an asset to touch computing devices using a stylus.

FIGS. 13-15 illustrate an exemplary stylus input device, workflows, and touch sensitive user interfaces (UIs), according to embodiments of the present disclosure. The workflows and UIs depicted in FIGS. 13-15 are described with reference to the embodiments of FIGS. 2, 3, and 5. However, the workflows and UIs are not limited to those example embodiments. In an embodiment of the invention, the interfaces for client applications 128a, 128b, and 128b' illustrated in FIGS. 13-15 are displayed on mobile computing devices 104a, 104b, and 104b', which each have a respective touch sensitive (i.e., touch screen) display device, namely 126a, 126b, and 126b'. For ease of explanation, the copy operations discussed in FIGS. 13-15 are in the context of a source client application 128a executing on a tablet computing device 104a with a touch-screen display device 126a, and the paste operations are discussed in the context of destination client applications 128b and 128b' executing on a smartphone computing device 104b with a touch-screen display device 126b and a tablet computing device 104b' with a touch-screen display device 126b'. However, the copy/paste operations are not intended to be limited to the exemplary devices and platforms shown in FIGS. 13-15. Non-limiting examples of operating systems and platforms having touch sensitive surfaces and screens include tablets and smartphones and running the iOS from Apple, Inc., the WINDOWS® Mobile OS from the MICROSOFT™ Corporation, the Windows® 8 OS from the MICROSOFT™ Corporation, the Android OS from Google Inc., the Blackberry OS from Research In Motion (RIM); and the Symbian OS. It is to be understood that the user interfaces illustrated in the exemplary embodiments of FIGS. 13-15 can be readily adapted to execute on displays of a variety of mobile device platforms running a variety of operating systems that support a touch interface.

Throughout FIGS. 13-15, input devices and displays are shown with various icons, command regions, windows, toolbars, menus, tiles, and buttons that are used to initiate action, invoke routines, copy assets, paste assets, or invoke other functionality. The initiated actions include, but are not limited to, selecting an asset to be copied to a clipboard, selecting a target location to paste an asset, and other clipboard-related inputs and gestures. For brevity, only the differences occurring within the figures, as compared to previous or subsequent ones of the figures, are described below.

In embodiments, the display devices 126a, 126b, and 126b' used to display the user interfaces shown in FIGS. 13-15 may be displayed via the display interface 1602 and the computer display 1630 described below with reference to FIG. 16. According to embodiments, a user can interact with touch screen displays 126a, 126b, and 126b' using the exemplary stylus input devices 103 shown in FIGS. 13-15. However, alternative and additional input devices can be used, such as a different stylus, a finger, a mouse, a keyboard, a keypad, a joy stick, a voice activated control system, or other input devices used to provide interaction between a user and client applications 128a, 128b, and 128b'. As described below with reference to FIGS. 13-15, such interaction can be used to indicate an asset to be copied to a clipboard, to navigate through multiple assets copied to a cloud based clipboard, and to select a target location where an asset is to be pasted.

FIGS. 13 and 14 illustrate how an exemplary input device 103 having a tip 1309, a button 1313, and an LED 1319 can be used to interact with display device 126a of a tablet computing device 104a to copy a selected asset 204 to a server-based clipboard 206 so that the copied asset 204' is available for a subsequent paste operation at a different computing device 104b. FIG. 15 shows how a copied asset 204' can be pasted into a presentation output of a different client application (i.e., cross-application) on a different computing device (i.e., cross-device).

FIG. 13 shows an embodiment where an asset 204 that has been copied to a local clipboard of a source computing device 104a can be transmitted to the server-based clipboard 206 (denoted as a Cloud Clipboard in the example of FIG. 13) provided by a cloud application 116. In an embodiment, the local clipboard of the source computing device 104a can be the local clipboard 218 discussed above with reference to FIG. 3. The cloud application 116 can notified via a transmission of data 210a that a copy operation has occurred on the computing device 104a before additional data 210a representing the asset 204 is sent to the cloud application 116. After this notification, additional data 210a representing the asset 204 is sent to the cloud application 116. As described above with reference to FIG. 3, data 210a representing the asset 204 can be serialized data 210a. In one embodiment, the asset 204 is encrypted at the source computing device 104a before it is transmitted to the cloud application 116, which stores an encrypted asset 204' in the server-based clipboard.

With continued reference to FIG. 13, after the asset 204 has been copied to the server-based clipboard 206, the identifier 302 for the copied asset 204' is transmitted back to the computing device 104a from the cloud application 116. The identifier 302 can be a reference to a storage location of the asset 204' within the server-based clipboard 206. In the example depicted in FIG. 13, the identifier 302 is a URL referencing a storage location of the copied asset 204' in a web server or other cloud storage device used by the server-based clipboard 206. The identifier 302 is then communicated to the stylus input device 103 from the computing device 104a. As seen in FIG. 13, the identifier 302 can subsequently be communicated from the stylus input device 103 to a destination client computing device 104b as part of a paste operation. The identifier 302 can then be sent with a request for the previously copied asset 204'. In response to such a request, the copied asset 204' is sent to the destination client computing device 104b as data 210b representing the copied asset 204'. In an embodiment, the asset 204' is transmitted from the server-based clipboard 206 to the destination computing device 104b as serialized data 210b. In embodiments the stylus input device 103 can dictate or control the state of clipboard operations. For example, cut, copy, and paste inputs or requests received from the stylus input device 103 can cause computing devices 104a, 104b to use the server-based clipboard 206, whereas cut, copy and paste inputs received from a finger touch on display devices 126a, 126b, or from other input devices cause the computing devices 104a, 104b to use their own respective, local clipboards (such as, for example, the local clipboard 218 shown in FIG. 3).

FIGS. 14 and 15 illustrate exemplary user interfaces and workflows for copying and pasting operations. In particular, FIG. 14 shows a copy workflow comprising inputs 1402-1406 and output 1408. Although described with reference to a copy operation, the workflow shown in FIG. 14 is applicable to a cut operation as well. As shown, an input 1402 can initiate a copy sequence at the source computing device 104a. The exemplary input 1402 is a 'long press' on the stylus button 1313 while the stylus is in the air (i.e., pressing the button 1313 and holding it down while in the stylus tip 1309 is not in contact with the display device 126a). Next, an input 1404 performs a copy operation. As shown in FIG. 14, the input 1404 comprises placing the stylus tip 1309 on an asset 204 in a canvas with a long press gesture and then releasing the button 1313 while the stylus tip 1309 is still in contact with the canvas (i.e., the presentation 202 output on the display device 126a). In one non-limiting embodiment, an input 1404 with a long press gesture of about 2 seconds will cause the client application 128a to perform a copy operation.

Next, input 1406 results in the asset 204 being copied to the server-based clipboard 206. In the example embodiment of FIG. 14, the input 1406 is a finger release from the stylus button 1313. FIG. 14 illustrates an embodiment in the context of copying an asset 204 that is part of layer content (i.e., a layer of the presentation 202). In this context, in response to input 1406 for an asset 204 that is layer content, an animation can be displayed by the client application 128a to give a user the impression that the copied asset 204 is being vacuumed into the stylus tip 1309. Such an animation can serve to cognitively reinforce the copy action by providing a visual indication within the presentation 202 that the selected asset 204 has been cut or copied. In an embodiment, the asset 204 is encrypted at the computing device 104a before being copied to the server-based clipboard 206 as an encrypted copy of the asset 204'. As discussed above with regard to FIGS. 3 and 5, encryption of selected asset 204 to produce an encrypted copy of the asset 204' can be performed by an encryption module 303 executing as part of the client application 128a or as a separate application on the computing device 104a. In cases where the asset 204 is encrypted for use in a secure server-based clipboard 206, a decryption key 338 usable to subsequently decrypt the encrypted asset 204' will be transmitted to the stylus input device 103 and stored in the memory 132 of the input device 103. The decryption key 338 may be generated by the computing device 104a and optionally encrypted to produce an encrypted key before being stored in the stylus input device 103.

After the copy action has been performed as a result of inputs 1402-1406, a confirmation output 1408 can be provided to notify a user that with that the copied asset 204' is available to be subsequently placed or pasted. The output 1408 can be displayed on the display device 126a by the client application 128a and/or by the stylus input device 103. The output 1408 confirms that the copied asset 204' is available to be placed or pasted within the same client application 128a, new destination applications 128b, 128b', and/or other touch computing devices 104b, 104b'. In the example provided in FIG. 14, the indication 1408 is embodied as the stylus LED 1319 being momentarily illuminated to convey to the user that the selected asset 204 has been copied to the sever-based clipboard 206 and that the stylus input device 103 is now 'loaded' with the identifier 302 of the copied asset 204'. In embodiments, the indication 1408 can comprise illuminating a green LED 1319 and then blinking the LED 1319 twice.

FIG. 15 shows an exemplary paste workflow comprising inputs 1502-1506. A paste operation can be performed in a destination client application 128b in response to input 1502. In the example embodiment of FIG. 15, input 1502 is a long press of the stylus tip 1309 to a target location on a display device 126b while the stylus button 1313 is pressed, followed by a release of the button 1313. Here, the target location can be conceptualized as part of a canvas or pre-existing presentation 208. After the paste operation, the pre-existing presentation 208 is rendered on the display device 126b together with the pasted asset 204" by the client application 128b. The input 1502 can comprise placing the stylus tip 1309 to the canvas with a long press gesture and then releasing the stylus button 1313 while the stylus tip 1309 remains in contact with canvas. In one embodiment a long press gesture of about 2 seconds in conjunction with pressing and releasing the stylus button 1313 will result in the asset 204" received from the server-based clipboard 206 being pasted at the selected target location within the client application 128b. In embodiments where the copied asset 204' was stored in the sever-based clipboard 206 in encrypted form, the paste operation initiated by input 1502 comprises a decryption step. As discussed above with regard to FIGS. 3 and 5, decryption of the copied, encrypted asset 204' to produce a decrypted copy of the asset 204" may be performed by a decryption module 305 executing as part of the client application 128b or as a separate application on the computing device 104b. A decryption key 338 will be transmitted from the stylus input device 103 to the computing device 104b for use by the decryption module 305.

With continued reference to FIG. 15, an input 1504 into an asset navigation interface of client application 128b' can be used to select one copied asset 204' from a plurality of copied assets 204' available to a computing device 104b' via the server-based clipboard 206. In the example shown in FIG. 15, the stylus tip 1309 or another input means can be used to navigate to a particular asset 204' from a menu or multiple, copied assets 204'. An asset that has been navigated to in the menu interface of client application 128b' can be selected for pasting by pressing the stylus button 1313 while placing the stylus tip 1309 on the navigated-to asset 204' with long press gesture and then releasing the button 1313 while the stylus tip 1309 is still in contact with the navigated-to asset 204'. Once the particular asset 204' has been selected via input 1504, it can be subsequently pasted into a pre-existing presentation 208' using input 1506, which can be identical to the input 1502 described above. As shown in FIG. 15, the input 1506 will cause the asset 204" retrieved from the server-based clipboard 206 to be pasted into a selected target area within the pre-existing presentation 208. FIG. 15 also shows that such a paste operation on the computing device 104b' can be performed with more than one input device 103. For example, input 1504 to perform a paste operation for a selected asset 204' can be received from the stylus input device 103 used to copy the asset to the server-based clipboard 206 or by another stylus input device 506. For example, the client application 128b' can cause the computing device 104b' to scan a data network 504 to discover the stylus input device 506. The stylus input device 506 can also communicate with other computing devices, such as the computing device 104b' executing a client application 128b'. The client application 128b' or the stylus input device 103 can provide the identifier 302 for a selected asset 204' to the stylus input device 506 via the data network 504. In this way the stylus input device 506 can paste a copied asset 204' using input 1506, even if the stylus input device 506 did not initiate copying of the asset 204 on the source computing device 104a.

Exemplary Computer System Implementation

Figure 16:
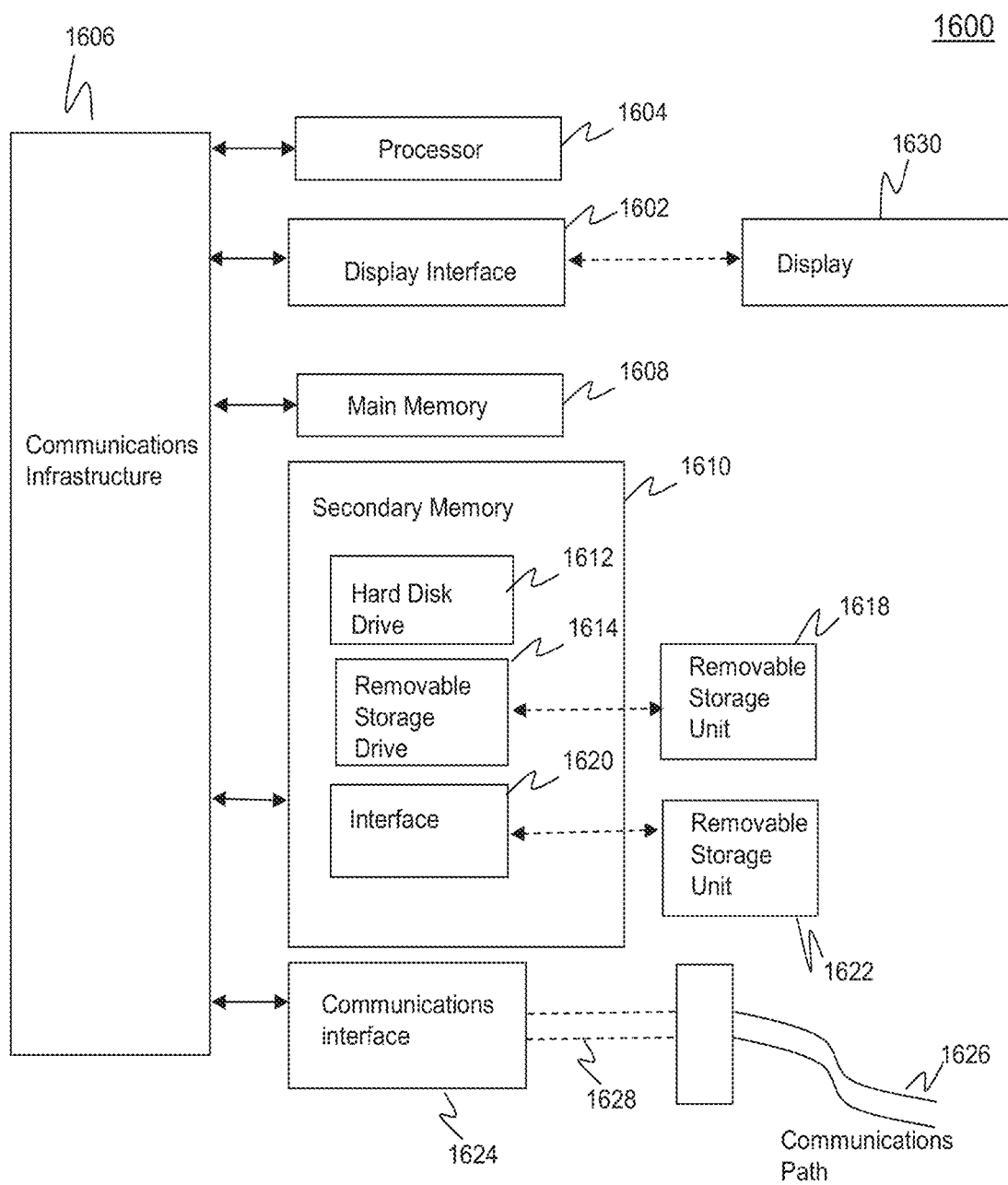
FIG. 16 is a diagram of an exemplary computer system in which embodiments of the present disclosure can be implemented.

Although exemplary embodiments have been described in terms of charging apparatuses, units, systems, and methods, it is contemplated that certain functionality described herein may be implemented in software on microprocessors, such as a microprocessor chip included in the input devices 103 and 506 shown in FIGS. 2, 3, and 5, and computing devices such as the computer system 1600 illustrated in FIG. 16. In various embodiments, one or more of the functions of the various components may be implemented in software that controls a computing device, such as computer system 1600, which is described below with reference to FIG. 16.

Aspects of the present invention shown in FIGS. 1-15, or any part(s) or function(s) thereof, may be implemented using hardware, software modules, firmware, tangible computer readable media having logic or instructions stored thereon, or a combination thereof and may be implemented in one or more computer systems or other processing systems.

FIG. 16 illustrates an example computer system 1600 in which embodiments of the present invention, or portions thereof, may be implemented as computer-readable instructions or code. For example, some functionality performed by the computing devices 104a, 104b and their respective client applications 128a, 128b shown in FIGS. 3 and 5, can be implemented in the computer system 1600 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the methods 400, 600, and 700 illustrated by the flowcharts of FIGS. 4, 6 and 7 discussed above and the server system 102 and cloud application 116 discussed above with reference to FIGS. 2, 3, and 5. Similarly, hardware, software, or any combination of such may embody the encryption module 303 and decryption module 305 discussed above with reference to FIGS. 3 and 5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1604 may be a special purpose or a general purpose processor device. As will be appreciated by persons skilled in the relevant art, processor device 1604 may also be a single processor in a multi-core/multiprocessor system, such system operating alone, or in a cluster of computing devices operating in a cluster or server farm. Processor device 1604 is connected to a communication infrastructure 1606, for example, a bus, message queue, network, or multi-core message-passing scheme. In certain embodiments, one or more of the processors 105, 118*a*, 118*b*, and 130 described above with reference to the server system 102, computing device 104*a*, computing device 104*b* and input device 103 of FIG. 2 can be embodied as the processor device 1604 shown in FIG. 16.

Computer system 1600 also includes a main memory 1608, for example, random access memory (RAM), and may also include a secondary memory 1610. Secondary memory 1610 may include, for example, a hard disk drive 1612, removable storage drive 1614. Removable storage drive 1614 may comprise a floppy disk drive, a magnetic tape drive, an optical disk drive, a flash memory, or the like. In non-limiting embodiments, one or more of the memories 108, 120*a*, and 120*b* described above with reference to the server system 102 and computing devices 104*a*, 104*b* of FIG. 2 can be embodied as the main memory 1608 shown in FIG. 16.

The removable storage drive 1614 reads from and/or writes to a removable storage unit 1618 in a well known manner. Removable storage unit 1618 may comprise a floppy disk, magnetic tape, optical disk, etc. which is read by and written to by removable storage drive 1614. As will be appreciated by persons skilled in the relevant art, removable storage unit 1618 includes a non-transitory computer readable storage medium having stored therein computer software and/or data.

In alternative implementations, secondary memory 1610 may include other similar means for allowing computer programs or other instructions to be loaded into computer system 1600. Such means may include, for example, a removable storage unit 1622 and an interface 1620. Examples of such means may include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to computer system 1600. In non-limiting embodiments, one or more of the memories 132 and 508 described above with reference to the input devices 103 and 506 of FIGS. 2, 3 and 5 can be embodied as the main memory 1608 shown in FIG. 16. For example, in one non-limiting embodiment, the memory 132 and the memory 508 of input devices 103, and 506, respectively, can be embodied as an EPROM.

Computer system 1600 may also include a communications interface 1624. Communications interface 1624 allows software and data to be transferred between computer system 1600 and external devices. Communications interface 1624 may include a modem, a network interface (such as an Ethernet card), a communications port, a PCMCIA slot and card, or the like. Software and data transferred via communications interface 1624 may be in the form of signals, which may be electronic, electromagnetic, optical, or other signals capable of being received by communications interface 1624. These signals may be provided to communications interface 1624 via a communications path 1626. Communications path 1626 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 1608 and secondary memory 1610, which can be memory semiconductors (e.g., DRAMs, etc.). Computer readable medium and non-transitory computer readable medium can also refer to removable storage unit 1618, removable storage unit 1622, and a hard disk installed in hard disk drive 1612. Signals carried over communications path 1626 can also embody the logic described herein. These computer program products are means for providing software to computer system 1600.

Computer programs (also called computer control logic) are stored in main memory 1608 and/or secondary memory 1610. Computer programs may also be received via communications interface 1624. Such computer programs, when executed, enable computer system 1600 to implement the present invention as discussed herein. In particular, the computer programs, when executed, enable processor device 1604 to implement the processes of the present invention, such as the steps in the method 600 illustrated by the flowchart of FIG. 6, discussed above. Accordingly, such computer programs represent controllers of the computer system 1600. Where the invention is implemented using software, the software may be stored in a computer program product and loaded into computer system 1600 using removable storage drive 1614, interface 1620, and hard disk drive 1612, or communications interface 1624.

In an embodiment, the display devices 126*a*, 126*b* used to display interfaces of client applications 128*a* and 128*b*, respectively, may be a computer display 1630 shown in FIG. 16. The computer display 1630 of computer system 1600 can be implemented as a touch sensitive display (i.e., a touch screen). Similarly, the user interfaces shown in FIGS. 8-15 may be embodied as a display interface 1602 shown in FIG. 16.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
receiving, from a stylus, a first input at a first computing device comprising a display, wherein the stylus includes a physical button, a tip, a storage medium, and a wireless transceiver configured to communicate with at least the first computing device, and wherein the received first input is based on one or more of an applied amount of pressure via the tip onto the display of the first computing device, clicking the physical button, and causing a movement of the tip against the display;
in response to a selected asset based on the received first input, transmitting, to a remote server system, an encrypted version of the selected asset for storage on the remote server system; and
providing to the stylus for storage thereon, a decryption key to decrypt the encrypted asset, and a unique identifier to identify the encrypted asset stored on the remote server system or to reference a storage location that corresponds to the encrypted asset stored on the remote server system, wherein the stylus is configured to transmit the decryption key and the unique identifier to a second computing device based on a second input received thereon from the stylus, and wherein the second computing device is configured to retrieve and decrypt the encrypted version of the selected asset.

2. The method of claim 1, further comprising:
in response to transmitting the encrypted asset to the remote server system, receiving, from the remote server system, the unique identifier, wherein the remote server system is configured to generate the unique identifier in response to receipt of the encrypted asset.

3. The method of claim 1,
wherein the second computing device is further configured to:
receive, from the stylus, a request for the asset at the second computing device, the request including at least the unique identifier,
based on the request, retrieve the asset indicated in the request on the second computing device, and
render, on a display of the second computing device, the retrieved asset.

4. The method of claim 1, wherein the first input is received via a first application executing on the first computing device, and wherein the second computing device is further configured to:
receive, from the stylus, a request for the asset via a second application executing on the second computing device, the second application being different from the first application, the request including the unique identifier,
based on the request, retrieve the asset indicated in the request on the second computing device, and
render, on a display of the second computing device, within an interface of the second application, the retrieved asset.

5. The method of claim 1, wherein the first input is received via a first application executing on the first computing device, and wherein the second computing device is further configured to receive, from the stylus, a request for the selected asset via a second application executing on the second computing device, the second application being different from the first application, the request including the unique identifier and a plurality of rendering attributes, the plurality of rendering attributes comprising at least one of:
a target location in a display of the second computing device;
a layer of the second application;
a scaling factor utilized by the second application or corresponding to a screen size of the second computing device; and
a color attribute utilized by the second application;
based on the request, retrieve by the second computing device, the selected asset;
based on the plurality of rendering attributes, render, on the display of the second computing device, within an interface of the second application, the retrieved asset.

6. The method of claim 1,
wherein the second computing device is further configured to receive, from the stylus, a request in an application executing on the second computing device, the request indicating the unique identifier,
based on the request, retrieve the encrypted version of the asset identified in the unique identifier of the request on the second computing device,
decrypt, utilizing the decryption key, the retrieved encrypted version of the asset on the second computing device, and
render, on a display of the second computing device, the decrypted asset.

7. The method of claim 1,
in response to the selected asset based on the received first input received at the first computing device from the input device, generating an encrypted version of the asset and a decryption key for decrypting the encrypted version of the asset.

8. A non-transitory computer storage medium storing computer-useable instructions that, when used by one or more computing devices, cause the one or more computing devices to perform operations comprising:
receiving, at a first computing device comprising a display, a first input from a stylus, wherein the stylus includes a physical button, a tip, a storage medium, and a wireless transceiver configured to establish a wireless connection with at least the first computing device, and wherein the received first input is based on one or more of an applied amount of pressure via the tip onto the display of the first computing device, a clicking of the physical button, and a movement of the tip against the display;
in response to a selected asset based on the received first input, encrypting the selected asset and generating a decryption key for decrypting the selected asset;
sending, to a server system remote from the first computing device, the encrypted asset for storage thereon;
receiving, from the server system, a unique identifier that identifies the encrypted asset stored in the server system or references a storage location corresponding to the encrypted asset; and
providing to the stylus, for storage in a storage medium thereof, the unique identifier and the decryption key, wherein the stylus is configured to provide a second computing device with the unique identifier and the decryption key to retrieve and decrypt the encrypted asset based on a second input received by the second computing device from the stylus.

9. The medium of claim 8, wherein the stylus is further configured to receive a request for the asset at the second computing device and provide, to the second computing device in response to the request, the unique identifier and the decryption key, wherein the second computing device is further configured to retrieve the encrypted asset from the server system utilizing the unique identifier and decrypt the encrypted asset utilizing the provided decryption key.

10. The medium of claim 8, wherein the asset is encrypted using a public encryption key.

11. The medium of claim 10, wherein the asset is decrypted using a private decryption key.

12. The medium of claim 8, wherein the asset is encrypted and decrypted using a private key.

13. The medium of claim 8, wherein providing to the stylus for storage in the storage medium further provides a rendering attribute of the asset, and wherein the second computing device is configured to modify the decrypted asset based on the rendering attribute.

14. A computer-implemented method comprising:
receiving, by a first application executing on a computing device, a cut input or a copy input from a stylus, wherein the stylus includes a physical button, a tip, a storage medium, and a wireless transceiver configured to establish a wireless connection with at least the computing device, wherein the received cut input or copy input is based on one or more of an applied amount of pressure via the tip onto the display of the first computing device, a clicking of the physical button, and a movement of the tip against the display, wherein the received cut input or copy input corresponds to a selected asset, and wherein the selected asset is copied to a local clipboard of the computing device in response to the received cut input or copy input;
transmitting, to a remote server system for storage thereon, an encrypted version of the selected asset, and first application information;

providing, to the stylus for storage thereon, a decryption key for decrypting the encrypted asset, a unique identifier that identifies the encrypted asset stored on the server system or that references a storage location that corresponds to the encrypted asset, and the first application information;

receiving, by a second application, a paste input from the stylus, wherein the received paste input includes the decryption key, the unique identifier, and the first application information;

based at least in part on the first application information, determining whether the selected asset copied to the local clipboard can be provided to the second application;

in response to determining that the selected asset copied to the local clipboard can be provided to the second application, retrieving the selected asset from the local clipboard;

in response to determining that the selected asset copied to the local clipboard cannot be provided to the second application, retrieving the encrypted asset from the remote server system utilizing the unique identifier, wherein the retrieved encrypted asset is decrypted by the computing device utilizing the decryption key; and rendering, within an interface of the second application, the decrypted asset.

15. The method of claim 14, wherein the first application information includes a rendering attribute having a first value, wherein the first value is specific to rendering the selected asset by the first application.

16. The method of claim 15, further comprising:
modifying the rendering attribute to have a second value, wherein the second value is specific to rendering the selected asset by the second application, and rendering the decrypted asset, utilizing the modified rendering attribute, within the interface of the second application.

17. The method of claim 16, further comprising generating, by the computing device, the decryption key for decrypting the encrypted asset.

18. The method of claim 15, wherein the second application is different from the first application.

19. The method of claim 14, wherein the second application is executing on a different computing device.

20. The method of claim 14, further comprising encrypting, by the computing device, the selected asset prior to transmission to the remote server system.

* * * * *